US008672509B2

(12) United States Patent
Gordin et al.

(10) Patent No.: US 8,672,509 B2
(45) Date of Patent: Mar. 18, 2014

(54) METHOD, SYSTEM AND APPARATUS FOR HIGHLY CONTROLLED LIGHT DISTRIBUTION FROM LIGHT FIXTURE USING MULTIPLE LIGHT SOURCES (LEDS)

(71) Applicant: Musco Corporation, Oskaloosa, IA (US)

(72) Inventors: Myron Gordin, Oskaloosa, IA (US); Lawrence H. Boxler, Oskaloosa, IA (US); Garrett J. Young, Sully, IA (US); Matthew D. Drost, Oskaloosa, IA (US); Luke C. McKee, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 13/706,467

(22) Filed: Dec. 6, 2012

(65) Prior Publication Data

US 2013/0094206 A1    Apr. 18, 2013

Related U.S. Application Data

(63) Continuation of application No. 12/467,160, filed on May 15, 2009, now Pat. No. 8,356,916.

(60) Provisional application No. 61/054,089, filed on May 16, 2008, provisional application No. 61/097,483, filed on Sep. 16, 2008.

(51) Int. Cl.
*F21V 33/00* (2006.01)
(52) U.S. Cl.
USPC .................. 362/249.02; 362/145; 362/249.03; 362/240; 362/243; 362/247
(58) Field of Classification Search
USPC ................... 362/145, 249.02, 249.03, 249.06, 362/311.02, 236, 237, 238, 240, 242, 243, 362/247
See application file for complete search history.

(56) References Cited

U.S. PATENT DOCUMENTS

| 4,450,507 A | 5/1984 | Gordin |
| 5,253,336 A | 10/1993 | Yamada |

(Continued)

FOREIGN PATENT DOCUMENTS

| CA | 2 727 258 | 12/2009 |
| CN | 101169232 A | 4/2008 |

(Continued)

OTHER PUBLICATIONS

Benthin, Carsten, et al., Interactive Headlight Simulation—A Case Study of Interactive Distributed Ray Tracing—, Computer Graphics Group, Saarland University, Technical Report TR-2002-03 (2002) (6 pages).

(Continued)

*Primary Examiner* — Laura Tso
(74) *Attorney, Agent, or Firm* — McKee, Voorhees & Sease, P.L.C.

(57) ABSTRACT

An apparatus, method, or system of lighting units comprising a plurality of lighting elements, such as one or more LEDs, each element having an associated optic which is individually positionable. In embodiments of the present invention, one or more optics are developed using optimization techniques that allow for lighting different target areas in an effective manner by rotating or otherwise positioning the reflectors, refractive lenses, TIR lenses, or other lens types to create a composite beam. The apparatus, method, or system of lighting herein makes it possible to widely vary the types of beams from an available fixture using a small number of inventoried optics and fixtures. In some cases, by using a combination of individual beam patterns, a small set of individual optics would be sufficient to create a majority of the typical and specialized composite beams needed to meet the needs of most lighting projects and target areas.

26 Claims, 32 Drawing Sheets

(56) References Cited

U.S. PATENT DOCUMENTS

| | | | |
|---|---|---|---|
| 5,906,425 A | 5/1999 | Gordin et al. | |
| 6,082,878 A | 7/2000 | Doubek et al. | |
| 6,250,774 B1 | 6/2001 | Begemann et al. | |
| 6,402,337 B1 | 6/2002 | LeVasseur et al. | |
| 6,543,911 B1 | 4/2003 | Rizkin et al. | |
| 6,679,621 B2 | 1/2004 | West et al. | |
| 6,899,443 B2 | 5/2005 | Rizkin et al. | |
| 6,948,838 B2 | 9/2005 | Kunstler | |
| 6,951,418 B2 | 10/2005 | Rizkin et al. | |
| 6,953,264 B2 | 10/2005 | Ter-Hovhannisian | |
| 7,004,603 B2 | 2/2006 | Knight | |
| 7,012,604 B1 | 3/2006 | Christie et al. | |
| 7,093,961 B2 | 8/2006 | Bentley et al. | |
| 7,229,194 B2 | 6/2007 | Liu et al. | |
| 7,385,360 B2 | 6/2008 | Dluzniak | |
| 7,429,757 B2 | 9/2008 | Oyama et al. | |
| 7,452,108 B2 | 11/2008 | Gordin et al. | |
| 7,495,817 B2 | 2/2009 | Hunt | |
| 7,503,669 B2 | 3/2009 | Rizkin et al. | |
| 7,540,629 B2 | 6/2009 | Steinberg | |
| 7,548,376 B2 | 6/2009 | Kim et al. | |
| 7,588,345 B1 | 9/2009 | Davis et al. | |
| 7,618,163 B2 | 11/2009 | Wilcox | |
| 7,625,102 B2 | 12/2009 | Koike et al. | |
| 7,654,705 B2 | 2/2010 | Czech et al. | |
| 7,744,246 B2 | 6/2010 | Rizkin et al. | |
| 7,766,509 B1 * | 8/2010 | Laporte | 362/249.02 |
| 7,857,497 B2 | 12/2010 | Koike et al. | |
| 7,959,326 B2 | 6/2011 | Laporte | |
| 7,976,199 B2 | 7/2011 | Berns et al. | |
| 8,002,435 B2 | 8/2011 | Laporte | |
| 8,018,457 B2 | 9/2011 | Peterson et al. | |
| 8,066,406 B2 | 11/2011 | Boyer et al. | |
| 2002/0163001 A1 | 11/2002 | Shaddock | |
| 2002/0198978 A1 | 12/2002 | Watkins | |
| 2003/0156410 A1 | 8/2003 | Ter-Hovhannisian | |
| 2003/0210555 A1 | 11/2003 | Cicero et al. | |
| 2005/0068765 A1 | 3/2005 | Ertze Encinas et al. | |
| 2006/0082989 A1 | 4/2006 | Wang | |
| 2006/0158887 A1 | 7/2006 | Holder et al. | |
| 2006/0176708 A1 | 8/2006 | Gordin et al. | |
| 2006/0181880 A1 | 8/2006 | Gordin et al. | |
| 2006/0181882 A1 | 8/2006 | Gordin et al. | |
| 2006/0291218 A1 | 12/2006 | Pazula | |
| 2007/0090362 A1 | 4/2007 | Ahn et al. | |
| 2007/0091444 A1 | 4/2007 | Kim et al. | |
| 2007/0201225 A1 | 8/2007 | Holder et al. | |
| 2008/0037239 A1 | 2/2008 | Thomas et al. | |
| 2008/0062689 A1 | 3/2008 | Villard | |
| 2008/0101063 A1 * | 5/2008 | Koike et al. | 362/231 |
| 2008/0191236 A1 | 8/2008 | DeGraaf et al. | |
| 2008/0192480 A1 | 8/2008 | Rizkin et al. | |
| 2008/0273333 A1 | 11/2008 | Berns et al. | |
| 2008/0285273 A1 | 11/2008 | Liu et al. | |
| 2009/0007978 A1 | 1/2009 | Alston et al. | |
| 2009/0100702 A1 | 4/2009 | Fair | |
| 2009/0103299 A1 | 4/2009 | Boyer et al. | |
| 2009/0284966 A1 | 11/2009 | Crookham et al. | |
| 2009/0322752 A1 | 12/2009 | Peterson et al. | |
| 2009/0323330 A1 | 12/2009 | Gordin et al. | |
| 2010/0002432 A1 | 1/2010 | Romano | |
| 2010/0103668 A1 | 4/2010 | Lueken et al. | |
| 2010/0103672 A1 | 4/2010 | Thomas et al. | |
| 2010/0157570 A1 | 6/2010 | Xiao et al. | |
| 2010/0290225 A1 | 11/2010 | Rizkin et al. | |
| 2010/0328931 A1 | 12/2010 | Fogerlie | |
| 2011/0083460 A1 | 4/2011 | Thomas et al. | |

FOREIGN PATENT DOCUMENTS

| | | |
|---|---|---|
| CN | 101220928 A | 7/2008 |
| CN | 102132088 A | 7/2011 |
| DE | 20 2008 004790 U1 | 8/2008 |
| WO | WO 01/86198 A1 | 11/2001 |
| WO | WO 2006/114726 A2 | 11/2006 |
| WO | WO 2007/044472 A2 | 4/2007 |
| WO | WO 2008/092271 A1 | 8/2008 |
| WO | WO 2008/106843 A2 | 9/2008 |
| WO | WO 2008/123960 A1 | 10/2008 |
| WO | WO 2009/149558 A1 | 12/2009 |
| WO | WO 2010/033545 A2 | 3/2010 |
| WO | WO 2010/033545 A3 | 3/2010 |
| WO | WO 2010/042186 A2 | 4/2010 |
| WO | WO 2011/123142 A1 | 10/2011 |

OTHER PUBLICATIONS

BetaLED, a Division of RUUD Lighting, Brochure—"uncompromisingBrilliance", www.betaLED.com/spec-sheets.aspx, 2009 (24 pages).
Color Gel, http://en.wikipedia.org/wiki/color_gel, Mar. 8, 2009, pp. 74-76.
Cree, Brochure—"Cree XLamp XR-E and XR-C LED—Binning & Labeling", CLD AP12 Rev. 8, pp. 1-15, Copyright 2004-2010 Cree, Inc. (15 pages).
Cree, Brochure—"Cree XLamp XP-E LEDs—Product Family Data Sheet", CLD-DS18 Rev. 12, pp. 1-15, Copyright 2008-2010 Cree, Inc. (16 pages).
Cree, Brochure—"Cree XLamp XP-G LEDs—Product Family Data Sheet", CLD-DS20 Rev. 5, pp. 1-12, Copyright 2009-2011 Cree, Inc. (12 pages).
Illuminating Engineering Society of North America (IESNA), IESNA Lighting Education, Fundamental Level, IESNA ED-100, TM-11-00, 3 pages.
IESNA, Light & Color, IESNA ED-100.1, 2 pages, brochure.
Jin, Xiaogang, et al., "Analytical methods for polynomial weighted convolution surfaces with various kernels", PERGAMON, Computers & Graphics 26 (2002) pp. 437-447 (11 pages).
Leadford, Kevin F., "Illuminance Calculations—The Lumen Method"—IESNA ED-150.5A, prepared for the Education Materials Committee, Illuminating Engineering Society of North America, 1993 (40 pages).
Lindsey, Jack L., et al., "Calculating Illuminance at a Point", IESNA ED-150.5B, prepared for the Education Materials Committee, Illuminating Engineering Society of North America, 1993 (32 pages).
Lumec, A Lumec White Paper—"LEDs for outdoor lighting applications" (date unknown) (11 pages).
Luminit Shaping Light As Needed, "Architectural/Event Lighting Diffusers", pp. 77-78, www.luminitco.com.
"MIRO", Anomet 2006 Brochure, 2 pages.
Paulin, Douglas, "Full Cutoff Lighting: The Benefits", IESNA LD+A/Apr. 2001, pp. 54-56.
Philips, "Radiation Patterns", http://www.lumileds.com/technology/radiationpatterns.cfm [retrieved from Internet on Apr. 28, 2007], 1 page.
Philips, "power light source LUXEON® Emitter", Technical Datasheet DS25, May 2007, 19 pages.
Philips LUMILEDS "Thermal Design Using LUXEON® Power Light Source" Application Brief AB05, Jun. 2006, 12 pages.
Philips-LUMEC, Brochure—"LEONIS—Landmark of a new world" (date unknown) (24 pages).
Philips-LUMEC, Brochure—"LifeLED / Breathing life", Copyright 2008 (20 pages).
Sample page from Numerical Recipes in Fortran &&: The Art of Scientific Computing (ISBN 0-521-43064-X): "6.7 Bessel Functions of Fractional Order, Airy Functions, Spherical Bessel Functions", pp. 234-245, Copyright 1986-1992 (12 pages).
Vose, Michael D., Excerpt from book entitled: "The Simple Genetic Algorithm—Foundations and Theory", The MIT Press, 1999 (139 pages).
Whitley, Darrell, "A Genetic Algorithm Tutorial" Colorado State University, Fort Collins, Colorado (date unknown) (37 pages).
Musco Corporation, PCT/US2009/057090, International Search report and Written Opinion of International Searching Authority, mailed May 10, 2010, and International Preliminary Report on Patentability dated Jan. 25, 2011.

(56) References Cited

OTHER PUBLICATIONS

Musco Corporation, PCT/US2010/034530, International Search report and Written Opinion of International Searching Authority, mailed Apr. 22, 2011, (6 pages).
Musco Corporation et al.,—Annex to the European Search Report on European Patent Application No. EP 09 81 5084 and Supplementary European Search Report, dated Jan. 30, 2012, (5 pages).
CN 101220928 A—Shi, Jie—English Abstract.
"Simple Guidelines for Lighting Regulations", http://www.darksky.org/mc/page.do?sitePageID=58881 [retrieved from the Internet on May 16, 2008], 3 pages.
CN 101169232—Stanley Electric—English Translation.
CN 102132088—Philips—English Translation.
Musco Corporation, et al., PCT/US2012/025599—International Search Report mailed Dec. 3, 2012, 4 pages.

* cited by examiner

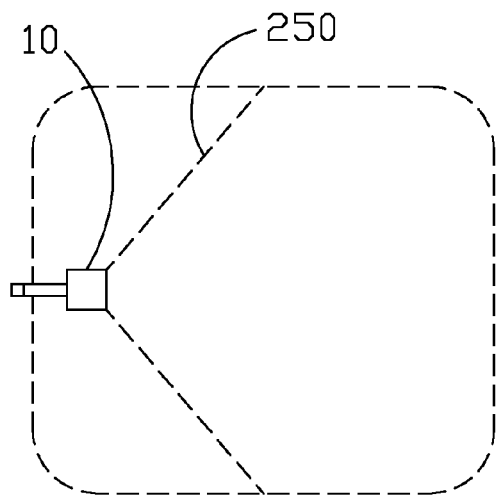
FIG 13A
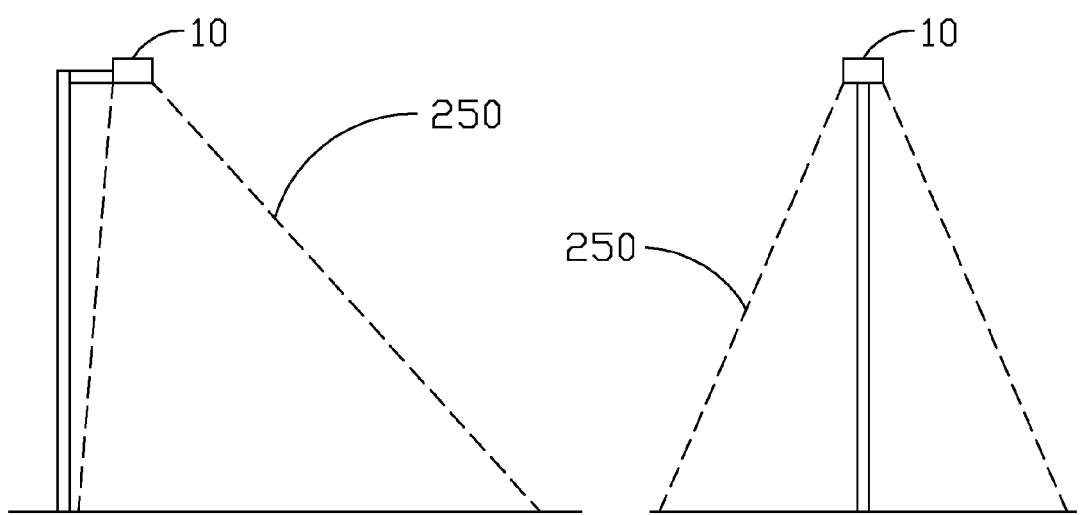
FIG 13B
FIG 13C

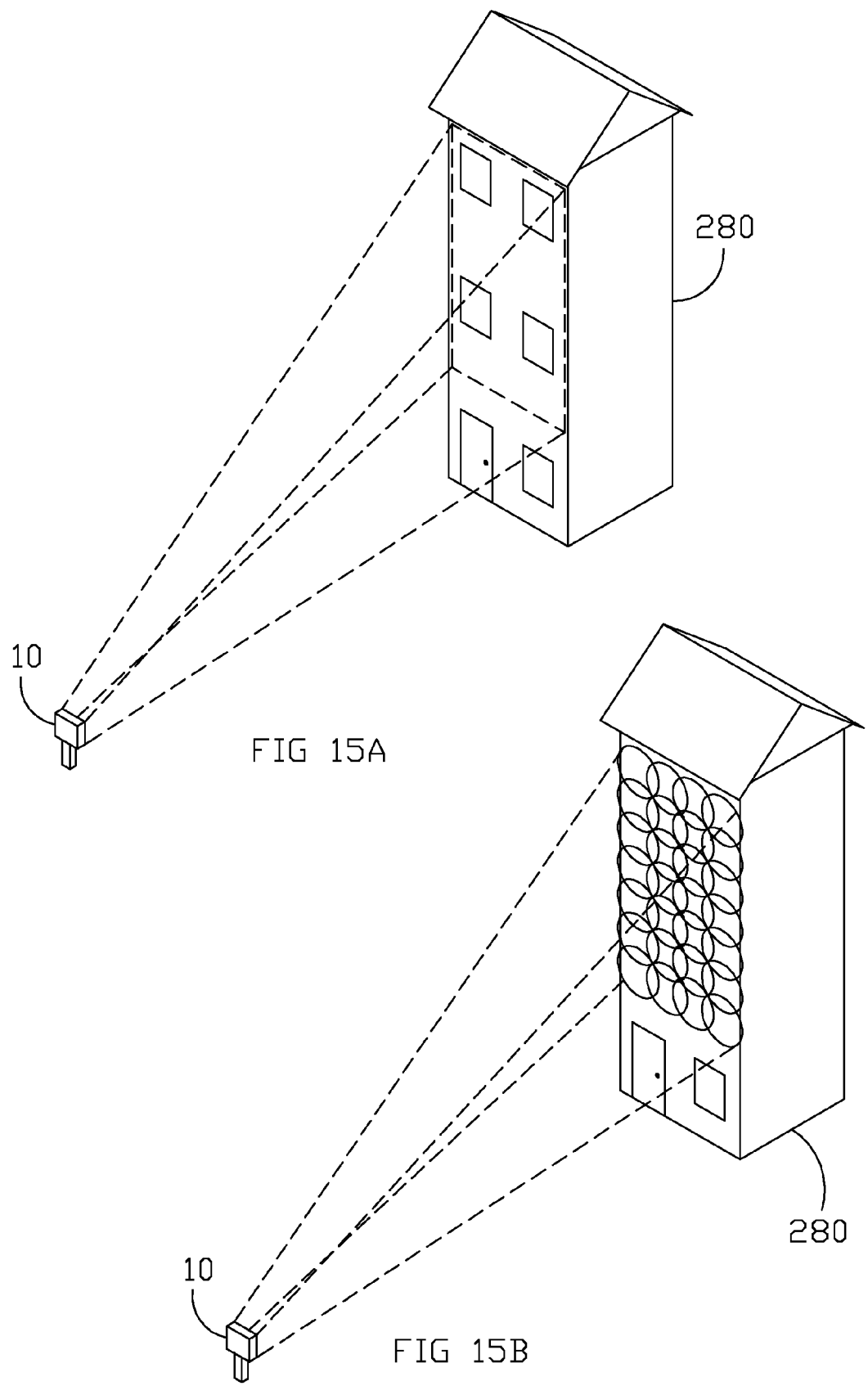

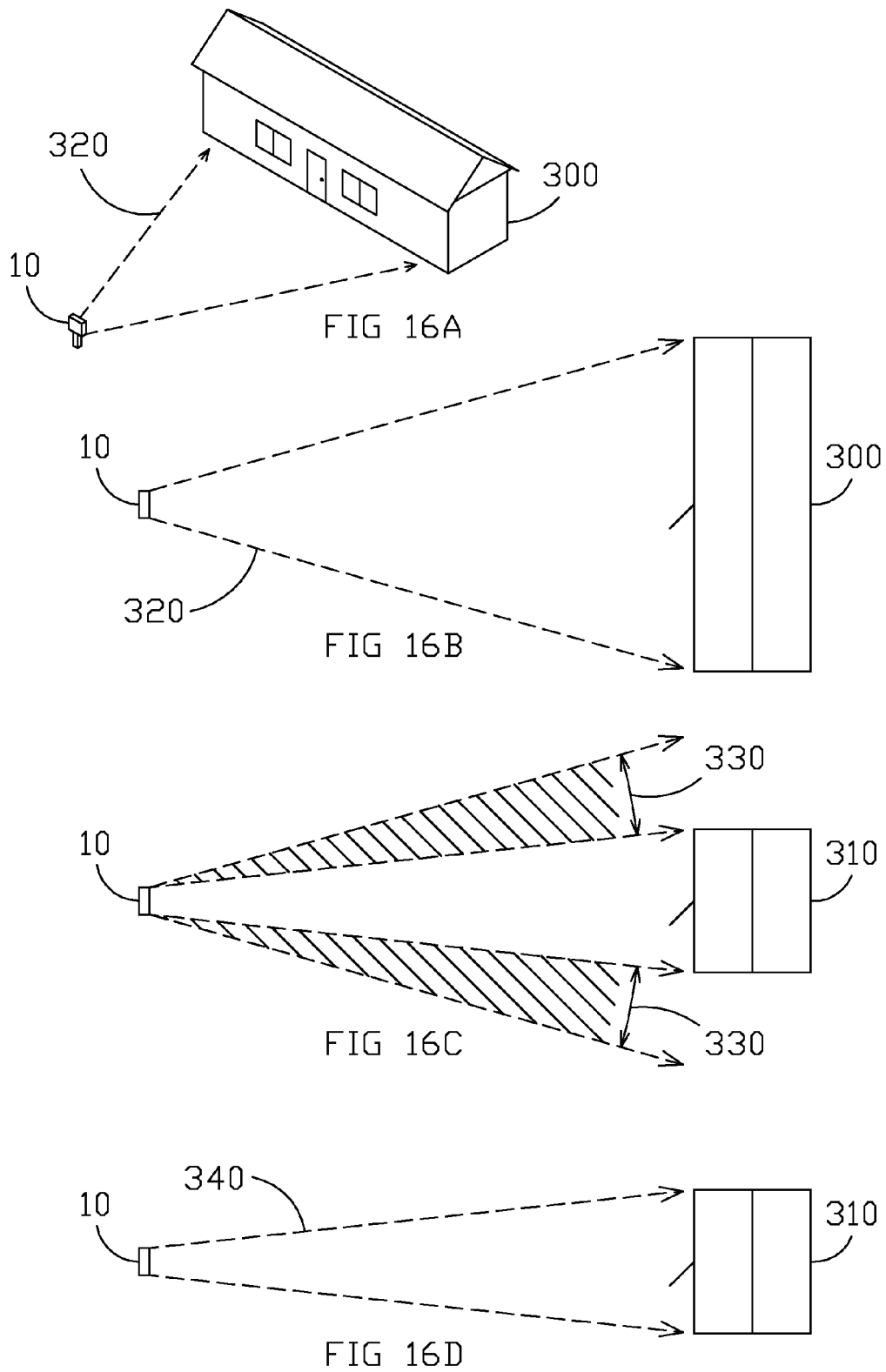

METHOD, SYSTEM AND APPARATUS FOR HIGHLY CONTROLLED LIGHT DISTRIBUTION FROM LIGHT FIXTURE USING MULTIPLE LIGHT SOURCES (LEDS)

CROSS-REFERENCE TO RELATED APPLICATIONS

This is a Continuation Application of U.S. Ser. No. 12/467,160 filed May 15, 2009, now issued U.S. Pat. No. 8,356,916, issued Jan. 22, 2013, which application claims priority under 35 U.S.C. §119 of provisional U.S. applications 61/054,089 filed May 16, 2008 and 61/097,483 filed Sep. 16, 2008, all of which applications are hereby incorporated by reference in their entireties.

BACKGROUND OF INVENTION

Embodiments of the present invention generally relate to systems and methods for lighting. In particular, embodiments of the present invention relate to systems, methods, and apparatus for highly controlled light distribution from a light fixture using multiple light sources, such as LEDs (light emitting diodes).

Existing HID fixtures use single large light sources which provide light beams which can be controlled somewhat by varying reflector design and mounting orientation. Typical LED fixtures having multiple small light sources function similarly. Each small light source has an optic (reflective or refractive lens) which creates a particular beam pattern. The beams from each LED are identical in size, shape, and cover the same area (the offset of a few inches based on position within the fixture is insignificant given the size of the beam as projected). This means that the beam from the fixture is simply a brighter version of a single beam.

This approach requires the optic being used with the LED be designed to produce the final shape of the luminaire output (for example an IES type II distribution) when combined with the LED. The disadvantage of this approach is that the designed optic can only be used for one type of distribution and requires separate development, tooling, and inventory control for each optic and beam type. An example of these types of fixtures are the LED fixtures produced by BetaLED (Beta Lighting Inc., Sturtevant, Wis.; www.betaled.com) which use an array of identical "Nanoptic"™ lens which are designed for each different type of beam desired.

Thus, these fixtures may be improved with regard to controlling the distribution and intensity of the beam, and control of glare and spill light. A light fixture which provides a beam pattern that is more easily varied and controlled is therefore useful and desirable in the lighting industry.

SUMMARY OF THE INVENTION

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention are described with reference to LEDs, LED lighting, etc., however, embodiments of the present invention are equally applicable to various other solid state (also referred to as solid-state) or other lighting devices (such as e.g., lasers) or fixtures that allow for multiple light sources to be packaged together in a small area.

For purposes of description it is convenient to describe the embodiments wherein the LEDs are facing up. For purposes of description of the composite beam output, it is convenient to describe the apparatus wherein the LEDs are facing down. Descriptions in terms of directional orientation is not intended to preclude mounting in any other orientation as desired.

It is therefore a principle object, feature, advantage, or aspect of the present invention to improve over the state of the art.

It is a further object, feature, advantage, or aspect of the present invention to solve problems and deficiencies in the state of the art.

Further objects, features, advantages, or aspects of the present invention include a method for creating a system of light distribution to provide lighting of a specified illumination to a pre-determined area. Said area can include standard beam shapes such as IES/NEMA beam types as well as individually customized beam shapes, including shapes having uneven light distribution with added or subtracted amounts of light in small areas which can be on the order of one meter square. One example, the composite beam, e.g. beam 200 as seen in simplified form from above in FIG. 2A, can be comprised of light beams 210 from a single fixture 10. Alternatively, the composite beam 220 may be formed from light beams 210 from multiple fixtures 10 that are part of a collective group (as seen in FIG. 2B). IES or IESNA (Illuminating Engineering Society of North America) and NEMA (National Electrical Manufacturers Association), and standard beam shapes are well-known to those skilled in the art.

Advantages of some embodiments include the ability to provide illumination of the desired shape, size and intensity to target areas of a pre-determined specification, such as corners, walkways, building surfaces, as well as areas in proximity to "low light zones" such as residences, parks, etc., using relatively high intensity (high candela produced), high efficiency (high lumens/watt) light sources. Other advantages include the ability to provide an even illumination of a target area that avoids harsh spots, shadows, glare, and other undesirable effects.

Further objects, features, advantages, or aspects of the present invention include an apparatus, method, or system of lighting units comprising a plurality of lighting elements, such as one or more LEDs, each element having an associated optic which is individually positionable. In embodiments of the present invention, one or more optics are developed using optimization techniques that allow for lighting different target areas in an effective manner by rotating or otherwise positioning the optics to create a composite beam. Associated optics may include reflectors, refractive lenses, TIR lenses, or other lens types. The determination of which type of associated optics to use can be based on applicability to a particular use such as emittance angle from the fixture, or manufacturing costs and preferences, for example.

Further objects, features, advantages, or aspects of the present invention include an apparatus, method, or system of lighting which makes it possible to widely vary the types of beams from an available fixture using a small number of inventoried optics and fixtures, thereby potentially reducing fixture cost, reducing lead time for custom lighting, and multiplying the versatility of any new fixtures or optics which could be created. In some cases, by using a combination of individual beam patterns, a small set of individual optics (perhaps on the order of less than 10) would be sufficient to create a majority of the typical and specialized composite beams needed to meet the needs of most lighting projects and target areas.

Apparatus

Some embodiments of the present invention provide for an apparatus comprising a lighting fixture with a plurality of individual light sources. The plurality of individual light sources may include solid-state light sources (such as LEDs). Each light source may include its own optic with elements such as reflectors, refractive lenses, light blocking tabs, and/or other elements. Each individual optic, according to embodiments of the present invention, is part of an array of optics placed in a specific location relative to the fixture and/or the other light sources. This array could be an arrangement of rows, a circular, radial, spiral pattern or any other pattern or shape. The individual optics could be mounted in the fixture by a means that also provides for adjustment in one or more directions relative to the light sources so as to vary the location of the individual beam within the composite beam. Adjustment of the optics could be preset by the manufacturing or assembly process, or the fixture could be manufactured such that the rotational position of individual optics could be set at installation or at a later time. This could allow, for example, a local inventory of individual fixtures that could be very quickly configured for given applications.

While traditional LED fixtures commonly mount the LEDs with snap-fit components and/or adhesives, these mounting techniques can lead to loss of position or alignment, or fixture failure within a short period of time relative to desired lifetime of area lighting fixtures (i.e., a few years vs. a desired lifetime on the order of decades). The envisioned mounting/adjustment method and apparatus provide improvements in the art.

According to embodiments of the present invention, the fixture may include LEDs mounted on a substrate that may be a circuit board of laminated or layered metal, standard circuit board materials, and/or other materials that provide dimensional stability, a means to provide or affix necessary circuitry, and optional benefits for thermal management.

In embodiments of the present invention, the fixture may optionally include elements to further direct or control the individual beams such as tabs (e.g. 35. FIG. 9) or analogous structure which may be affixed within the fixture relative to one or more individual light sources and placed in such a way as to restrict direct, non-reflected or non-controlled light or similarly to restrict light emitted at an angle which is not desired for the particular application.

System

Embodiments of the present invention provide for a system that uses a plurality of fixtures or fixture groups placed at various spaced-apart locations within or around an area to be lighted. Further, embodiments of the present invention can use one or more groups with one or more fixtures per group to provide a desired level of illumination within a target area of a pre-determined specification in order to provide coordinated benefits of the above lighting method for areas such as sports fields, parking lots, buildings, etc.

Method of Designing Lighting System

According to embodiments of the present invention, designing the lighting system may require two or three separate steps, including analyzing the intended application, selecting individual optics, and designing the composite beam. These steps may be repeated as necessary to optimize the design.

a) Creating Composite Beam

In one aspect, the beam is composed as follows: the light beam from each optic (i.e. the beam produce by light from a light source which is directed by the optic) produces a portion of the overall beam pattern. This beam portion may be the primary or essentially the only light source for a certain portion of the target; alternatively, by combining a set of these optics that project various beam types (for instance circular, elongated, or oblong beams), a series of overlapping beams can be built to a desired pattern (e.g. FIG. 3D) at a desired level of illumination, which can help to compensate for the distance (inverse square law) and incident angle (cosine law) or for other factors. For example, more individual beams can be directed towards the farther edges of the composite beam (see e.g. FIG. 3B), or different beam patterns (e.g. circular, elongated, narrow, wide, etc.) having different intensities can be created such that distribution in the target area is even (e.g. many 'ten degree' circular beams might be used for illuminating the area farthest from the fixture, while fewer 'twenty degree' beams could be used closer to the fixture and so on). The beam edges may overlap the adjoining beam at any desired degree to provide uniform distribution or the entire beam may overlap another beam to increase the intensity, and the composite beam can be composed of a combination of a number of individual beams of different sizes, shapes, distribution angles, and orientations (e.g. subject only to available lens design, an "oblong" beam 403 FIG. 4 could be oriented axially with the beam, transverse to the beam, or at some other angular orientation relative to the beam axis). The result would be a beam distribution, in a rectangle, oblong, oval, circle, fan, or other shape as desired as illustrated in FIGS. 3A-3E.

In accordance with embodiments, as might be used on a sports field, such a beam could provide illumination at, for example, the base of the light fixture mounting pole as well as to distant areas on a field. Additionally, in embodiments of the present invention, the beam could be cut off at the edge of a field (FIG. 3C) while still providing adequate illumination close to the edge of the field. Examples of shapes which can be easily adapted to illuminate, for example, the corner of a field (FIG. 3E), a football field (see FIG. 3D), a short and wide building 270 (see FIGS. 14A-C), a tall and narrow building 280 (see FIGS. 15A-15B), as well as many other specific shapes and configurations are shown.

'Pixellation'

Unlike conventional lighting fixtures, embodiments of the present invention can provide 'granular' or 'pixellated' control of light at a high level of precision, wherein for a given application, small areas, which could be on the order of 1 square meter (more or less according to lens design, mounting height, fixture mounting angle, etc.), can have brightness somewhat controlled. This allows areas within the target area to be emphasized. For buildings, signs, or other applications where a sharply defined shape is to be illuminated, these embodiments provide greater flexibility than conventional lighting.

In an example, an HID lamp putting out 36,000 lumens can cover approximately 180 m$^2$ (an area 12 m×15 m) at 200 lux (lumens/m$^2$). Embodiments of the present invention provide for a fixture that includes multiple LEDs that can cover the same 180 m$^2$ area. Each single LED, in one example, is capable of putting out 200 lumens and provides enough light for one square meter. This provides a level of precise control that provides, in effect, a "pixel by pixel" control of illumination on a target area, which both conventional HID and LED lighting cannot do. Both conventional HID and conventional LED fixtures are limited to the beam pattern as projected from the fixture, with minor modification possible by use of methods which can only affect the whole beam or a large portion of the beam.

Additional Optional Elements

An embodiment that uses reflective-type lenses might not work well if a flat plate glass cover, e.g. 40, FIG. 1B, were required for the fixture and the fixture needed to be oriented more or less parallel to the ground, since some beam patterns might require a high angle of incidence. The result might be that the light might be reflected by the surface of the cover rather than transmitted through the cover. In this case, it might be more effective to use the refractive lens design or to change the cover design. Use of anti-reflective coatings for covers is well known in the art, with theoretical allowable angles of incidence up to 60° from normal, which could increase usability of refractive lenses at higher angles. However, their use is generally limited to about 45 degrees from normal, which could make the use of refractive lens arrays rather than reflective arrays more effective under some circumstances.

Optional additional elements could include an additional lens or lenses or other optical element in association with the fixture which may contribute to the overall lighting effect or may provide other benefits such as enhanced aesthetics, protection of the components of the fixture, or reducing any unpleasant visual effects of directly viewing the fixture.

A fixture using an array of LEDs could allow light at an angle which is relatively controlled and that might be acceptable for some applications but could still benefit from additional control. Using a single visor of a type which is common to existing lighting fixtures would tend to either completely block the light emitted from the lights near the front of the fixture (refer to FIG. 7B) or to have little or no effect on the angle of emission from the light sources near the rear of the fixture. (refer to FIG. 7C). Multiple visors 797 as shown in FIG. 7D would provide an additional novel means of precisely controlling light from a fixture.

Aimability

Some embodiments of the invention provide or enhance the ability to pre-aim a fixture at the factory relative to a particular location or application. The envisioned embodiments may be easily pre-aimed, since their placement of light on an area can be accurately established and indexed to the intended mounting positions of the fixtures. Additionally, the fixtures may be aimed precisely in the field by indexing from individually aimed lights/optics or from precision manufactured reference location on the fixture.

BRIEF DESCRIPTION OF THE DRAWINGS

Embodiments and aspects of the present invention will be described and explained through the use of the accompanying drawings in which:

FIGS. 13A-13C illustrate a composite beam with a wide beam which projects light from a low to high range of incident angles according to embodiments of the present invention;

FIGS. 16A-D are similar to FIGS. 14A and B and showing how a beam that could be suitable for a wide building could be modified to be suitable for a narrow building.

Figure 1A:
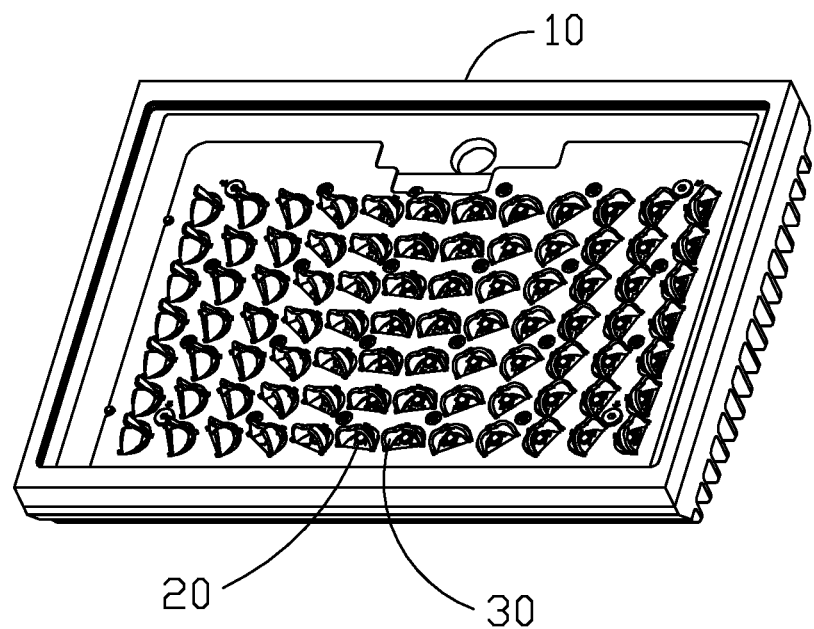
FIGS. 1A-1B illustrate a fixture according to embodiments of the present invention.
Figure 1B:
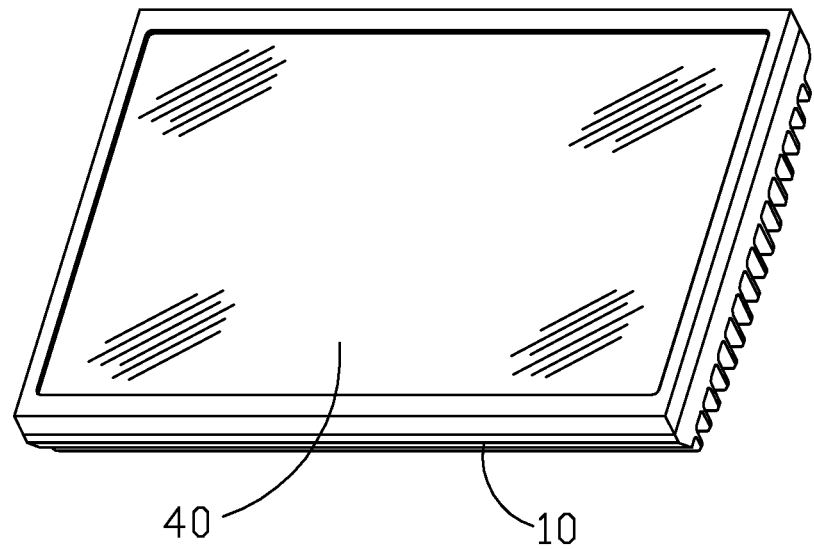

The figures have not necessarily been drawn to scale. For example, the dimensions of some of the elements in the drawings may be expanded or reduced to help improve the understanding of the embodiments of the present invention. Moreover, while the invention is amenable to various modifications and alternative forms, specific embodiments have been shown by way of example in the figures and are described in detail below. The intention, however, is not to limit the invention to the particular embodiments described. On the contrary, the invention is intended to cover all modifications, equivalents, and alternatives.

DETAILED DESCRIPTION OF EXEMPLARY EMBODIMENTS

Embodiments of the present invention provide for an apparatus, system, and method for creating a composite beam from LEDs (or other individual light sources) and associated optics such as reflectors or lenses. The composite beam can be comprised of light beams from a single fixture (see FIG. 2A), or light beams from light sources of multiple fixtures that are part of a collective group (see FIG. 2B). Said fixture contains a plurality, which may be a large plurality, of individual light sources 20, FIG. 1A and their associated optics. Associated optics may include reflectors 30, FIG. 1A, refractive lenses 60 FIG. 1C, TIR lenses 50 FIG. 1C, or other lens types. The determination of which type of associated optics elements to use can be based on applicability to a particular use, which can include considerations of type and shape of fixture (e.g. in order to consider such things as wind loading and aesthetics), mounting angle, ambient conditions, etc.

A. Exemplary Method for Designing a Lighting System—Overview

In general, the lighting professional using embodiments of the present invention will first analyze the intended application, then, select individual optics, and design the composite beam. Of course this process may be iterative given possible design conditions and constraints.

Analyzing the Application

In analyzing the application, a determination will be made regarding the size and shape of the intended target area and desired illumination level based on intended usage, yielding a total desired lumens value or figure. Then a determination of the minimum number of fixtures of the type anticipated to be used can be made, based on the number of lumens per light source and number of light sources per fixture which must provide the required total lumens. These values, parameters, or figures will then be modified, based on requirements for the target area, such as e.g. preferred, allowable, and prohibited fixture mounting locations, fixture setback from the target area, mounting height, calculations of angle of incidence of the illumination and consideration of the inverse square law of optics. Given these items, using one of several possible methods, the lighting designer will begin designing the light layout to provide desired illumination of the target area. This will be similar to designing using conventional HID or LED fixtures. However, the designer can plan lighting at a much finer scale since the individual light sources each contribute a small amount to the total light applied to the entire target area. Additionally, unlike using conventional HID or LED lighting, if there are any areas for which the amount of light should be increased or reduced, this can be accomplished by changing the aiming of a few individual light sources without necessitating a significant reduction or increase in light on adjacent areas.

a) Select or Design Individual Optic

If satisfactory individual optics for the given application are already in existence, one or more types may be selected to potentially meet the needs of the application which has been previously analyzed. If not available from previous design, new ones may be designed. One method that may be used according to embodiments of the present invention is discussed later.

Figure 2A:
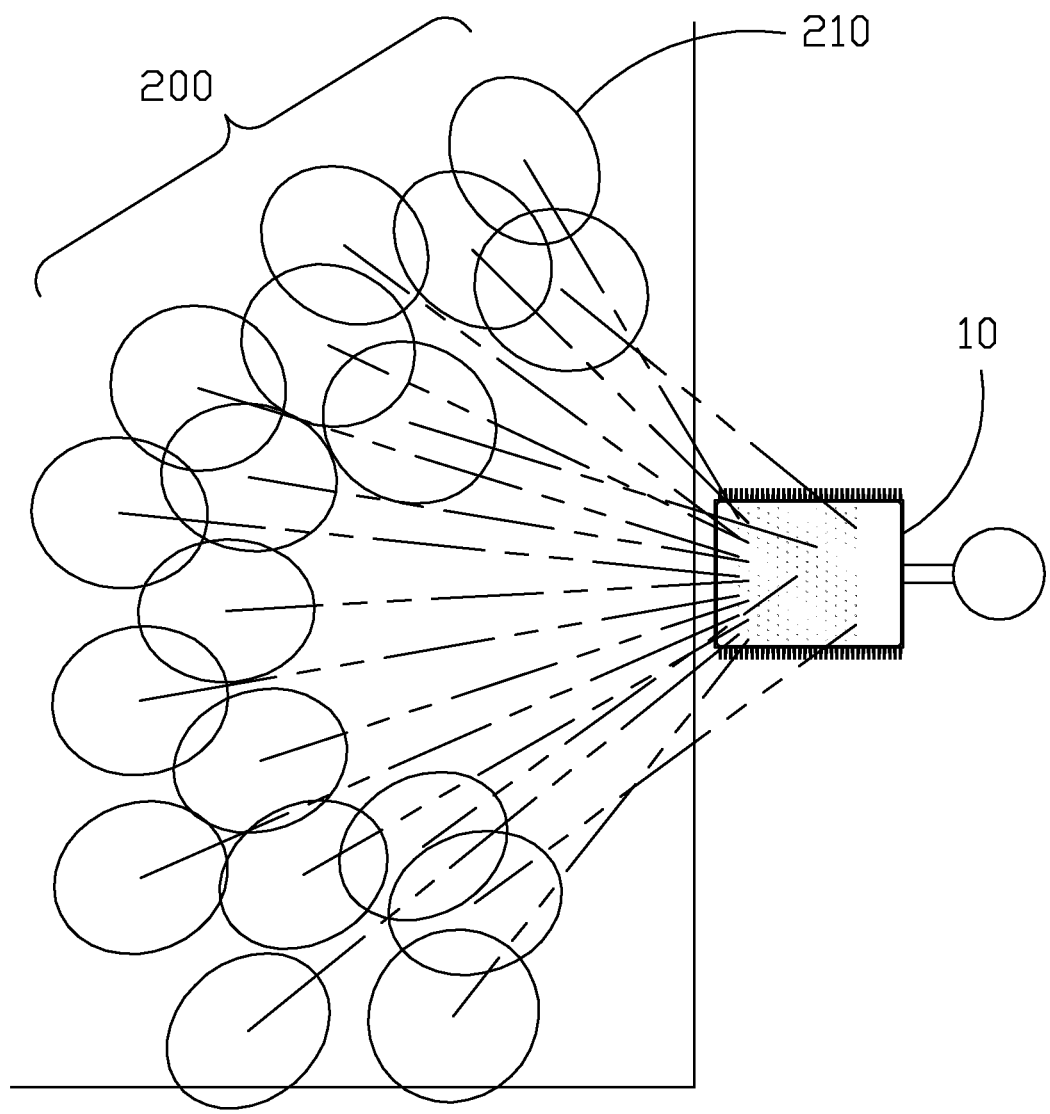
FIGS. 2A-2B show aspects of formation of a composite beam according to embodiments of the present invention.

One advantage of the present invention is that a single optic, or limited number of optics, can be used to create multiple lighting configurations. This is done by creating an optic that creates a portion of a beam pattern that can be used with an LED or similar light in an array of similar lights to create the desired final beam pattern shape from the luminaire (e.g. IES type V). The desired final beam pattern is created using the aforementioned designed optic with an LED array and positioning the optic at various angles to the LED to create the final beam pattern using the sub-pattern from each optic. FIG. 2A illustrates an example of a composite beam 200 formed by sub-beams 210.

While embodiments of the present invention can be used for creating area lights having patterns as prescribed by the IES types, the pattern from the luminaire is not constrained to the IES types and can be used to custom configure a luminaire for a specific lighting task.

Select or Design Fixtures

Within the design process, individual fixtures will be selected for use with the appropriate optics. These fixtures will be placed in groups on poles or in mounting locations according to the overall plan for the application. At this point the original design considerations and selection of optics will be re-examined and changes made as necessary to fine-tune the design.

B. Detailed Development of Optics

Deficiencies of Parabolic Optics

The development of the optic for the sub-beam is now described according to certain aspects of the invention. While a parabolic optic is easily designed and may be used in embodiments of the invention, other types of optics can provide more desirable results. It is well known that a parabolic surface when combined with a light source at the parabolic focus produces a spot beam that is aimed along the axis of the parabola. This spot beam can be directed by pointing the parabolic axis in the desired direction. However, one disadvantage of the spot beam from the parabola for area illumination is that the intensity profile from the reflector will create a non-uniform distribution on the area being illuminated, with an intense spot in the center with a sharp transition to zero light on the edge. This is ordinarily not an optimum output beam for use in illuminating areas. A desirable pattern usually contains a more uniform distribution with light directly below the luminaire smoothly transitioning to the edge of the beam.

Embodiments of the present invention provide for systems and methods for being able to develop several different beam types from a single optic design that has been specially designed to allow for the smooth blending of a sub-beam into a composite beam. This is accomplished with a single optic rather than multiple optics, a single development cycle, and a single piece to inventory, resulting in distinct advantages in cost and speed to market.

Embodiments of the present invention provide for creating a modified parabolic shape to produce an output beam that both projects a spot to be used as a sub-beam, and creates a smooth distribution on the area being illuminated in order to have sub-beams that can be combined to create desirable illumination beams from the full luminaire. An example angular output for a parabolic optic pointed at 70° to nadir and a CREE (Durham, N.C. USA) model XRE White LED is shown in the graph in FIG. 6D (units are candela), which illustrates a characteristic "spot" type beam from the system. Taking this beam and using it to illuminate a plane 10 feet below the system as an area type light yields the distribution on the ground is shown in FIG. 6E (units for the output are footcandles).

Modifying Parabolic Optics

Figure 6A:
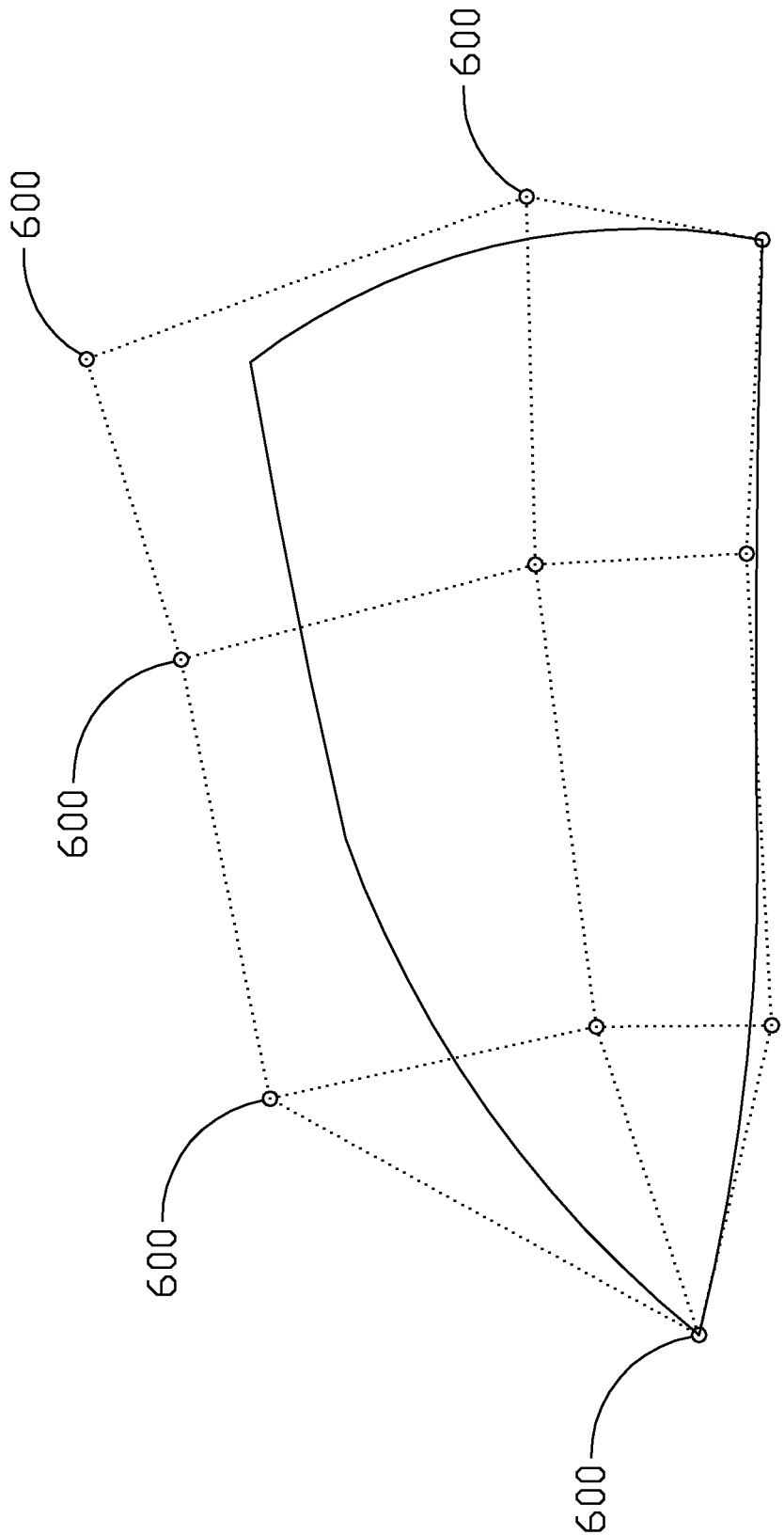
FIG. 6A shows Bezier controls used in the design of a reflective optic element according to embodiments of the present invention.

An example starting point with Bezier control points 600 is shown in FIG. 6A. Each control point is parameterized via its X,Y,Z coordinate and its control point weight W. The basic parabola shape produces a spot beam.

The parabolic shape is parameterized using a Bezier polynomial scheme to allow for adjustment of several parameters to control the reflector shape to achieve a desired output distribution. Bezier mathematics are used extensively in computer aided design and are known to those skilled in the art. The result of using Bezier mathematics is a simplified list of points and control points that generally describe the surface and allow for manipulation of the surface through these parameters. The use of Bezier splines for optical design is well documented.

The parameterized parabola is redefined using an automated optimization routine to drive the reflector shape to produce a sub-beam that will produce a more uniform output beam when arranged as with the parabola spot beams above. The optimization routine is a genetic algorithm (see, e.g., Vose, Michael D (1999), *The Simple Genetic Algorithm: Foundations and Theory*, MIT Press, Cambridge, Mass. Whitley, D. (1994); and *A Genetic Algorithm Tutorial*. Statistics and Computing 4, 65-85). A genetic algorithm can be beneficial in solving these types of problems due to the large number of variables and the uncertain behavior of the merit function. The genetic algorithm used may include real valued chromosomes along with tournament selection, crossover, and mutation. Other variations of genetic algorithms can be used as required. The merit function in at least one embodiment is defined as the falloff of illumination from the center of the pattern to the edge of the pattern. The value of the merit function was increased as this falloff became closer to a linear falloff. Of course, depending on the desired use, the merit function would be different for different applications. The merit function is well-known (see, e.g., Press, W. H.; Flannery, B. P.; Teukolsky, S. A.; and Vetterling, W. T. "Bessel Functions of Fractional Order, Airy Functions, Spherical Bessel Functions." §6.7 in *Numerical Recipes in FORTRAN: The Art of Scientific Computing, 2$^{nd}$ ed.* Cambridge, England: Cambridge University Press, 1992).

Table 1.0 shows the surface definition of an optic that was created using this merit function. The optic is defined by the 3rd Degree×3rd Degree Bezier Patch (see, e.g., U.S. Pat. No. 5,253,336 regarding 3$^{rd}$ Degree Bezier Patch) Description:

TABLE 1.0

Surface Definition

| Pt # | X | Y | Z | Weight |
|---|---|---|---|---|
| 1 | 9.52 | 7.88 | −0.79 | 1.000 |
| 2 | 11.59 | 6.18 | 5.97 | 1.547 |
| 3 | 7.82 | 4.74 | 13.22 | 2.368 |
| 4 | 6.84 | −0.04 | −0.46 | 1.296 |
| 5 | 9.70 | 1.83 | 3.48 | 2.968 |
| 6 | 5.43 | 3.48 | 10.46 | 3.859 |
| 7 | 3.61 | −4.24 | −0.15 | 0.739 |
| 8 | 5.28 | −0.96 | 4.98 | 1.846 |
| 9 | 3.19 | 1.34 | 9.22 | 0.771 |
| 10 | 0.00 | −2.63 | 0.00 | 1.000 |
| 11 | 0.00 | −2.60 | 6.91 | 2.113 |
| 12 | 0.00 | 0.67 | 9.27 | 0.727 |
| 13 | 0.00 | 4.57 | 11.53 | 1.000 |

Figure 6B:
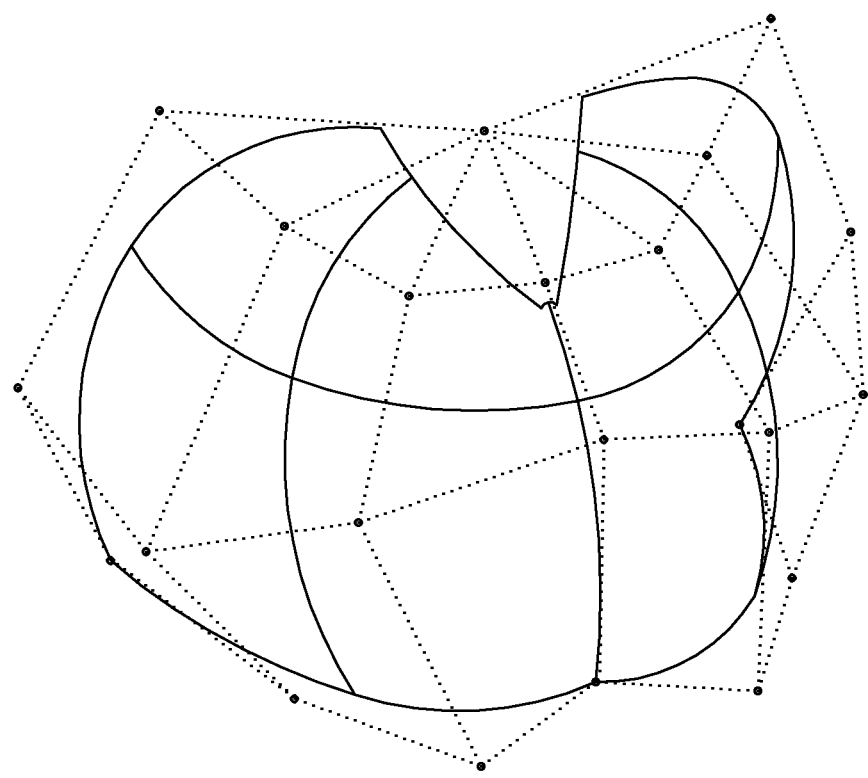
FIG. 6B is a graphical representation of an untrimmed image of an optic created according to embodiments of the present invention.
Figure 6C:
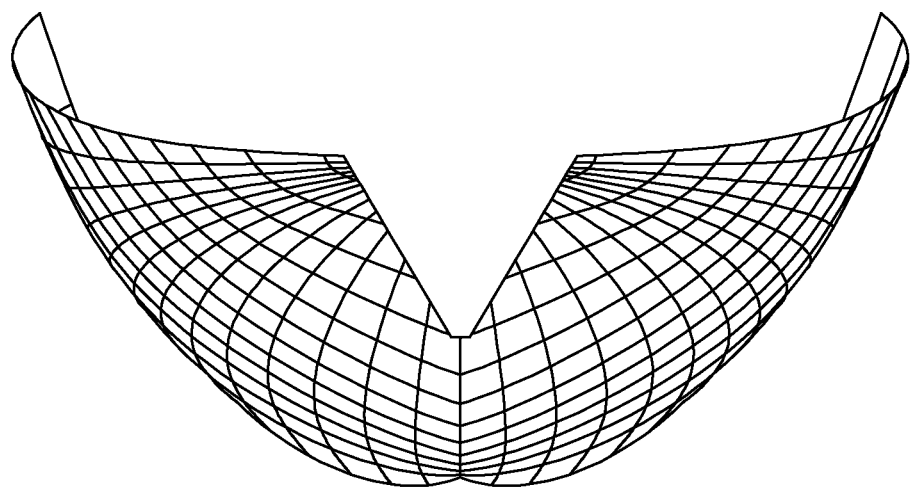
FIG. 6C is a graphical illustration of the trimmed image based on the trim line of an optic according to embodiments of the present invention.
Figure 6D:
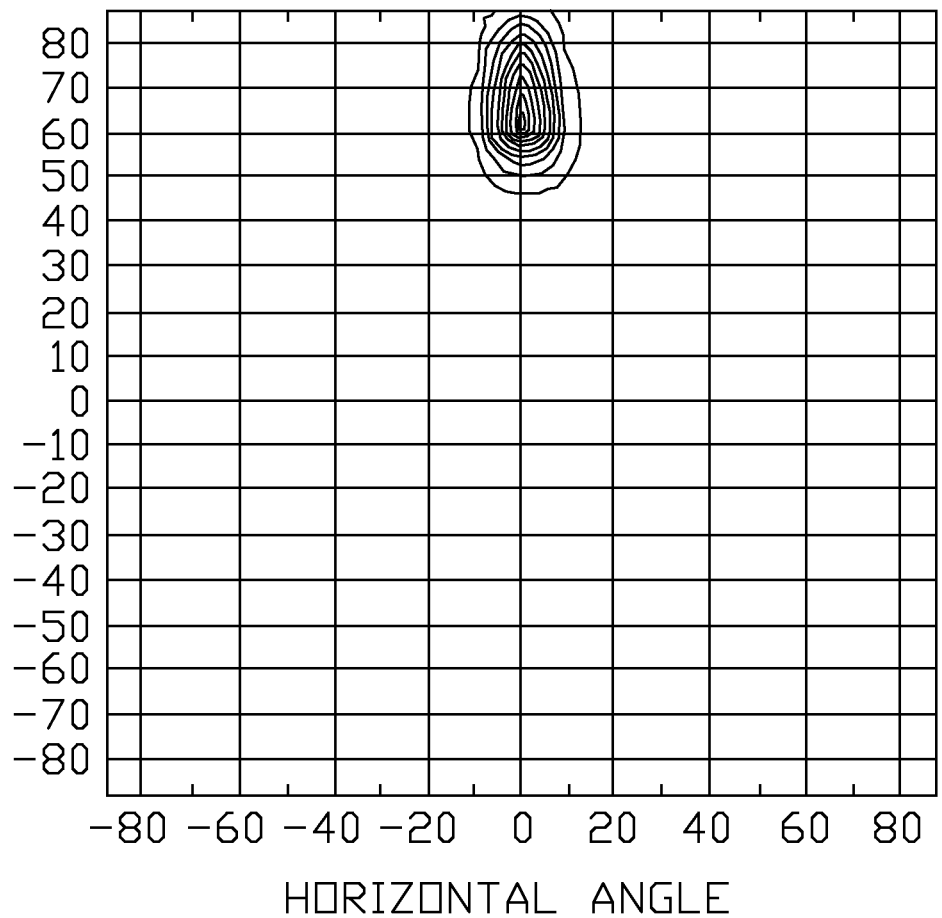
FIG. 6D shows isocandela traces based on a typical parabolic reflective optic element.
Figure 6E:
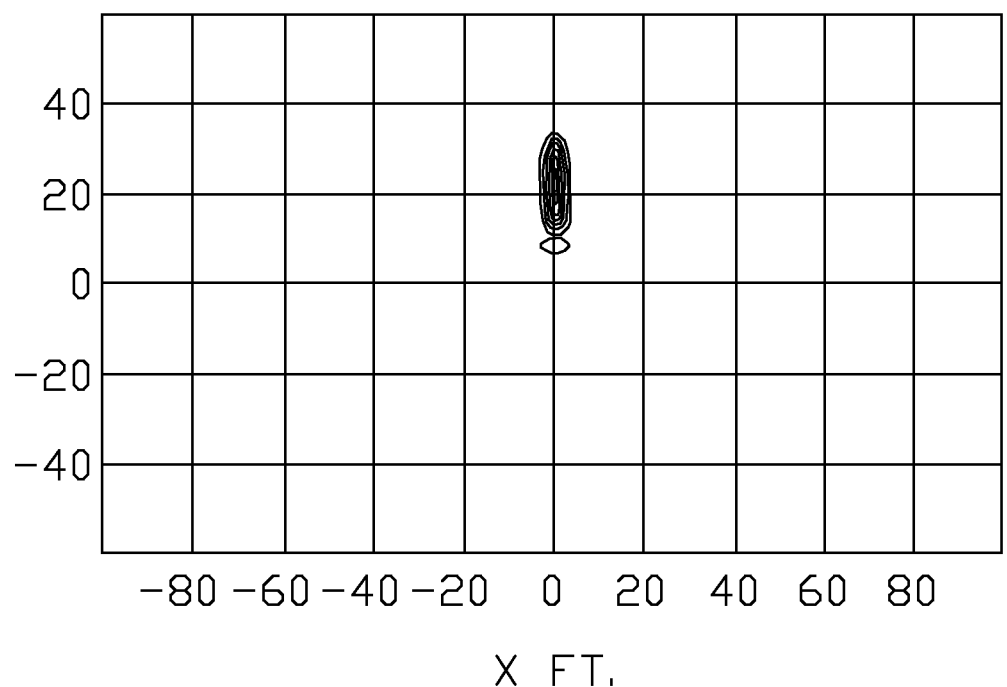
FIG. 6E shows footcandle traces based on a typical parabolic reflective optic element.

Note that only the right half control points are listed as the left half is symmetric about y axis. FIG. 6B is a graphical representation of the untrimmed image (showing control points on both halves), while FIG. 6C is a graphical illustration of the trimmed image based on the trim line described in Table 2.0.

TABLE 2.0

Trim Line for Notch

| Pt # | X | Y | Z |
|---|---|---|---|
| 1 | 0 | 0.54 | 0 |
| 2 | 0.213 | 0.54 | 0 |
| 3 | 2.647 | 4.645 | 0 |

Figure 6F:
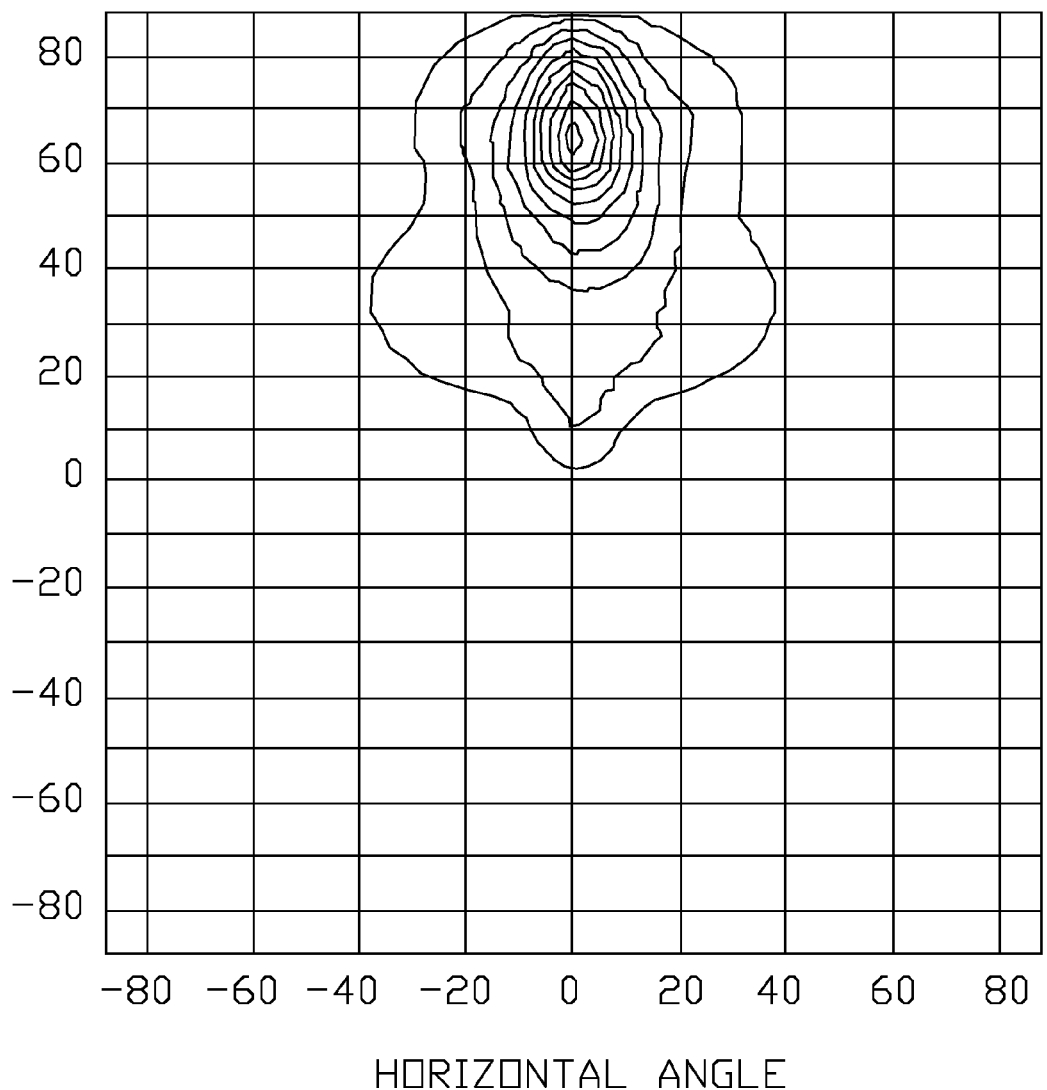
FIG. 6F shows isocandela traces based on a modified reflective optic element created according to embodiments of the present invention.
Figure 6G:
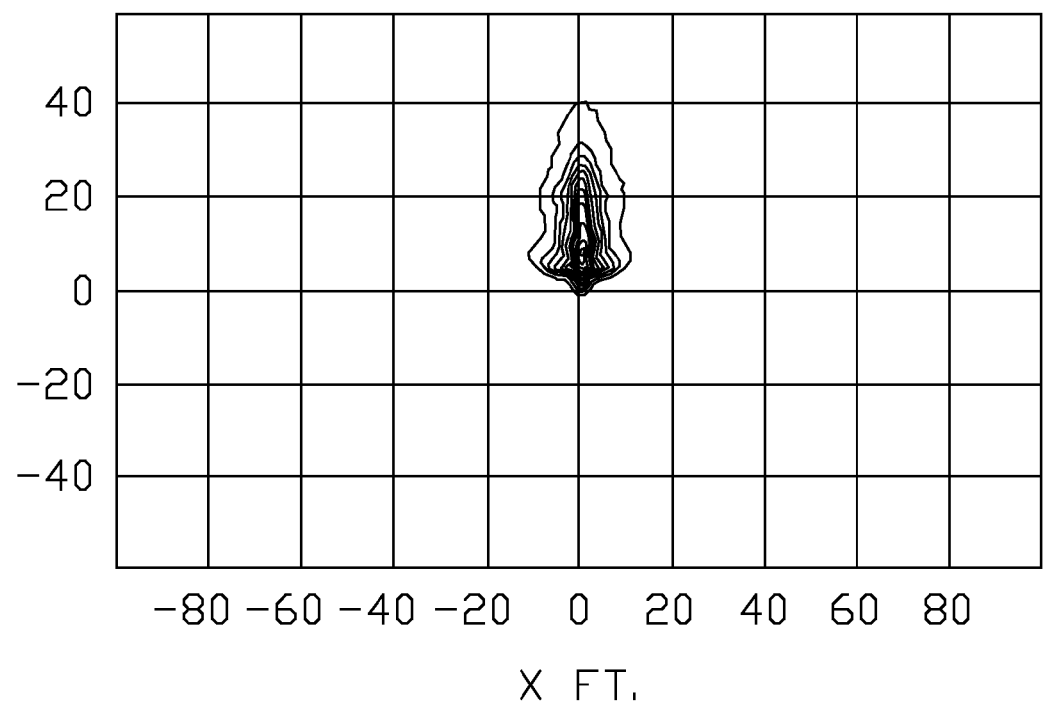
FIG. 6G shows footcandle traces based on a modified reflective optic element created according to embodiments of the present invention.

After optimization of the shape, the sub-beam has the following angular and illumination outputs as shown in FIGS. 6F and 6G. When the optics are subsequently arranged by rotation around the LEDs to achieve a specific pattern, the resulting output pattern is a more desirable illumination.

Exemplary Genetic Programming Algorithm

In embodiments of the genetic algorithm, the variables that are manipulated are the X,Y, and Z coordinates of each control point, along with the Bezier Weight of each control point (see, e.g., Xiaogang Jin and Chiew-Lan Tai, *Analytical methods for polynomial weighted convolution surfaces with various kernels*, Computers & Graphics, Volume 26, Issue 3, June 2002, Pages 437-447). For the specific example, there were 36 variables. The merit function was determined by taking a slice through the illuminance data from a single reflector starting at 5 feet from the fixture out to 50 feet from the fixture. The data was taken in 1 foot increments, and then compared to a theoretical uniform line through those same points. The deviation from the line at each point was calculated and squared, and the total difference was the square root of the sum of those squares. The fitness function for the algorithm has to actually increase to show better performance, so the final merit value was 1/(total difference) so that it would approach infinity as the fit to the line got better. The actual code to calculate the fitness is shown here:

```
M1=0
$DO 5 50
{
VALUE ? 0 P1
M1=M1+((−0.0356*(?)+4.4778)−P1)^2
}
RETURN
LINEDIF=SQRT(M1)
FITNESS=1/LINEDIF
```

In the specific example, a real valued chromosome was used (in other words, the variables were not converted into zeros and ones) with 36 Genes (the total number of variables). The population size was set to 100. A tournament format was used to determine which chromosomes survived to be parents of the next generation and had 8 individuals compete in the tournament. The tournament selection was random. Crossover was performed using a random crossover mask where a 0 means to keep the first parents gene and 1 means to keep the second parents gene and reversed the order of parents to generate a pair of children for each pair of parents. Mutation in the children was allowed using a mutation threshold of 0.3 (30% chance of mutation) with a mutation amount limited to 37.5% the amount of mutation was chosen randomly to be between 0 and 37.5% if mutation occurred). 1000 generations for the optimization were run.

As will be appreciated by those of ordinary skill in the art, there are probably other combinations that could be used to either speed up the results or obtain higher fitness functions.

C. Exemplary Method—Creating Customized (Non-Standard) Beam Shapes

Customized Beam Principles

In accordance with embodiments of the present invention, individual optics may be designed using well-known optical principles to project a beam of a desired shape and distribution. For example, the optic can provide a type 5 lateral beam distribution with long vertical distribution, or a type 2 lateral beam distribution with short vertical distribution, or any other desired beam distributions. Design and construction methods for the optical lens and reflector are well known in the art.

Fixtures which are nearly parallel to the ground which are illuminating a distant target have an emittance angle that is 'flatter' relative to the fixture, for which reflective optics may be more appropriate, while fixtures which oriented more vertically relative to the ground, or which are illuminating a target that is less distant or that is directly underneath have an emittance angle that is 'steeper' relative to the fixture, for which refractive optics may be more appropriate. However, there is considerable overlap between the alternatives and therefore choice of reflective vs. refractive would be made according to the circumstances. Alternatively, for some applications, use of both reflective and refractive optics on the same fixture might be appropriate.

Design of Composite Beam Per IESNA

Having analyzed the overall application of the light to the target area, and selected or designed the appropriate individual optics, the designer will lay out each individual optic within each fixture to design the composite beam. In order to design a specific composite beam for a given application and target area, several methods could be used which are known to those of ordinary skill in the art. A discussion of several methods can be found in the *IESNA Lighting Education: Intermediate Level*, New York: Illuminating Engineering Society of North America, ©1993, sections 150.5A and 150.5B.

Figure 4:
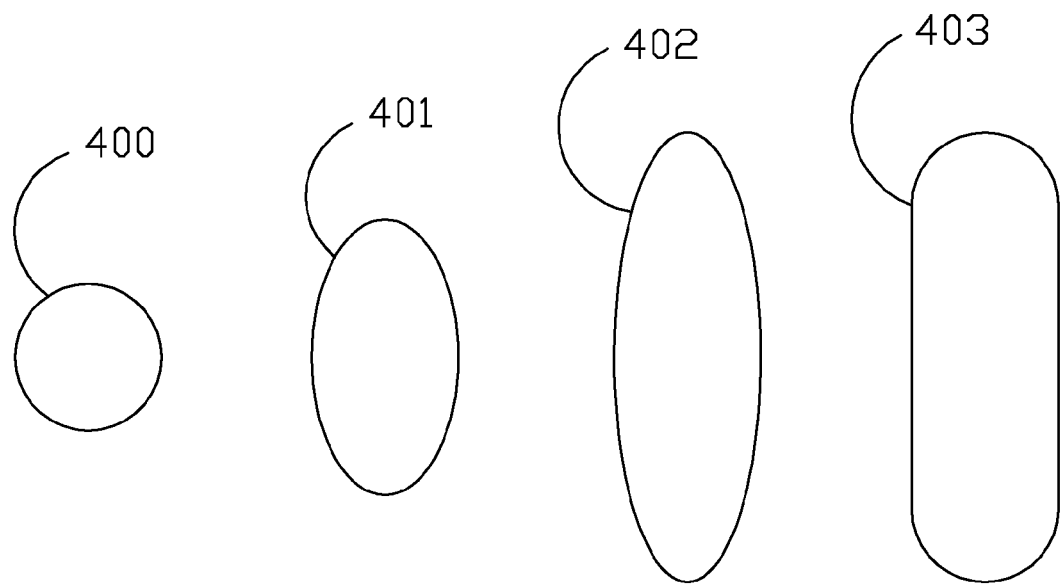
FIG. 4 shows examples of some beam shapes that may be created or used as sub-beams according to embodiments of the present invention.

In embodiments, light modeling can be used to select the optic design and orientation of the individual light beams to create the composite beam from the fixture. For example, selecting one or more of the beam shapes 400-403 shown in FIG. 4 or from other beam shapes, the lighting designer, with optional assistance from a commercially available lighting software program, can produce the desired composite beam shape and intensity. The designer can determine the number and combinations of beam patterns provided by the lenses within the fixtures. For each project, the designer can proceed to select individual fixtures which use a certain number of reflective and/or refractive lenses. As designed, the selected lenses would be assigned a position and orientation within the fixture such that light is distributed as desired on the target area. In accordance with embodiments of the present invention, special consideration can be given to edges of target areas in order to provide even lighting at the edges without excessive spill light beyond the target area.

Design of Beam by Luminaire Equivalence

Another method of designing a specific composite beam in embodiments of the present invention is calculating the "luminaire equivalence" of each individual optic combination, using existing or custom lighting design software. Using this method, each individual source is considered as a luminaire. The designer can select the optic system based on its photometric properties and place the light from each individual source onto the target area as desired. This process would be repeated until the desired composite beam shape and intensity level was achieved. In one or more embodiments, some level of automation could be added to the design process if desired.

Design of Beam by Standard Layout Tools

Figure 3A:
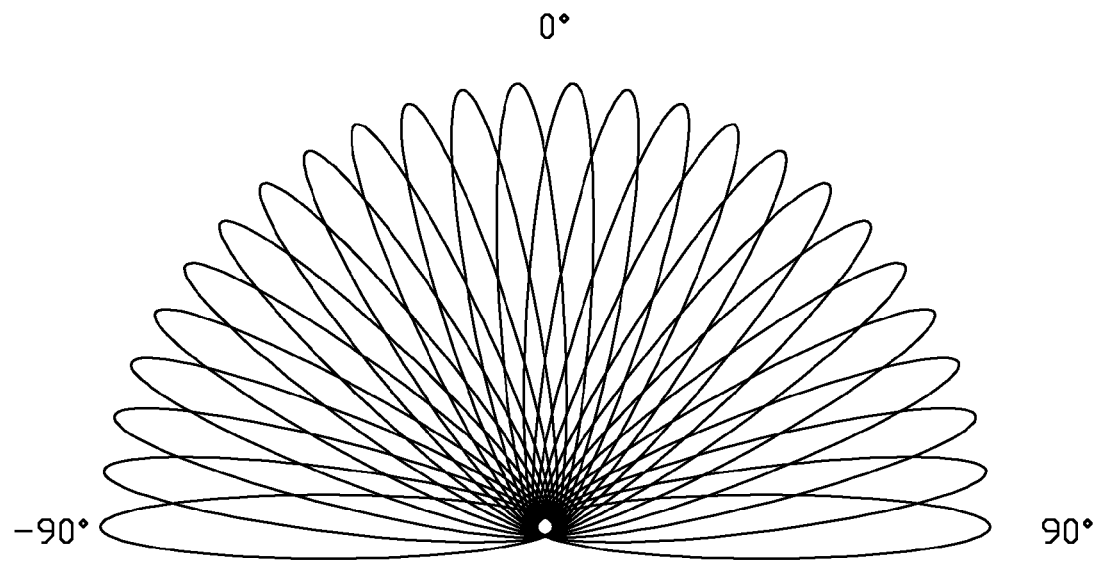
FIGS. 3A-3E illustrate potential composite beam layouts according to embodiments of the present invention.
Figure 3B:
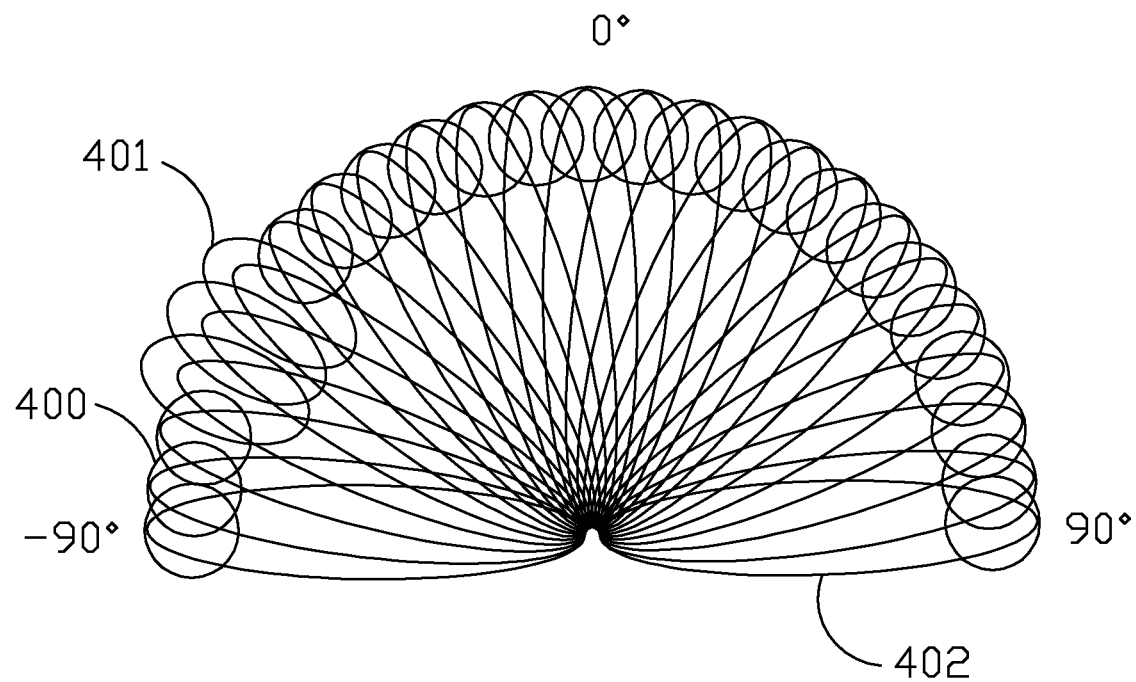
Figure 3C:
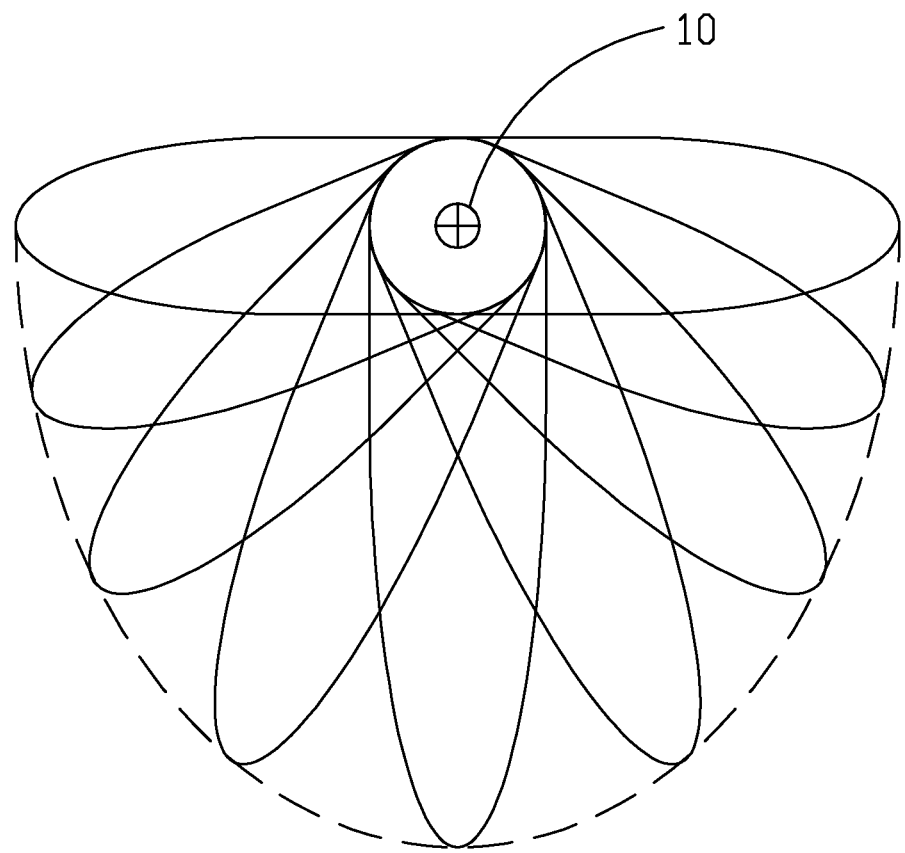
Figure 3D:
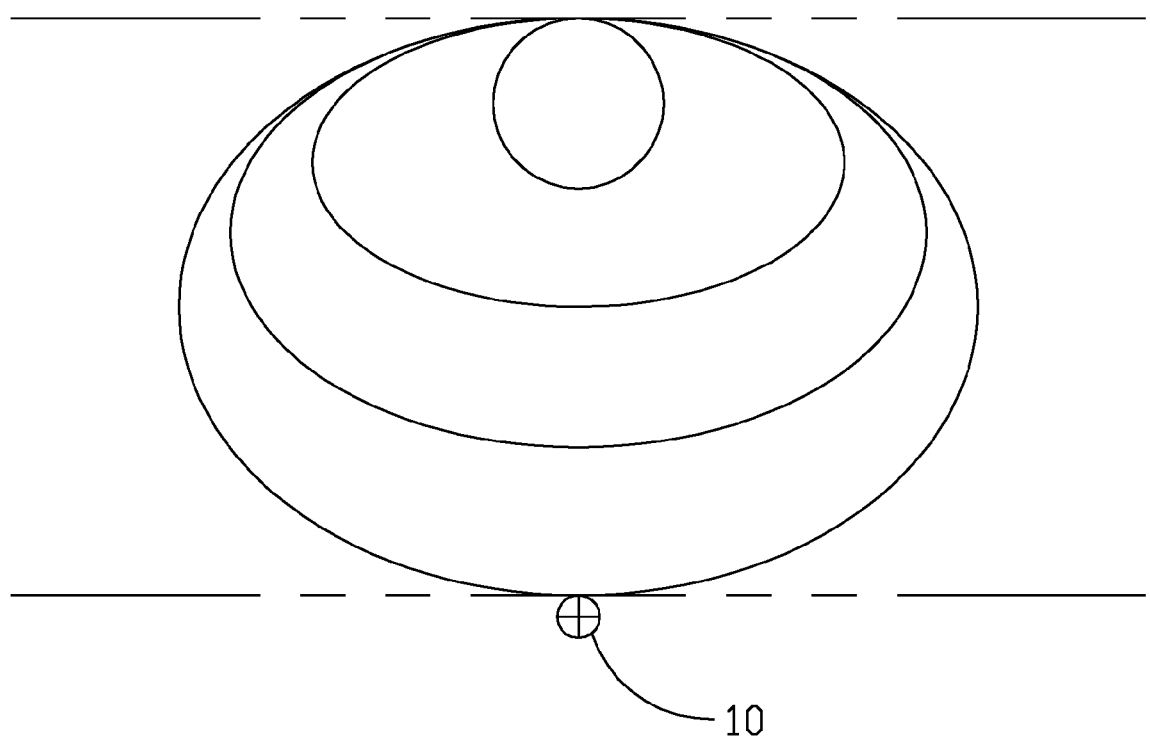
Figure 3E:
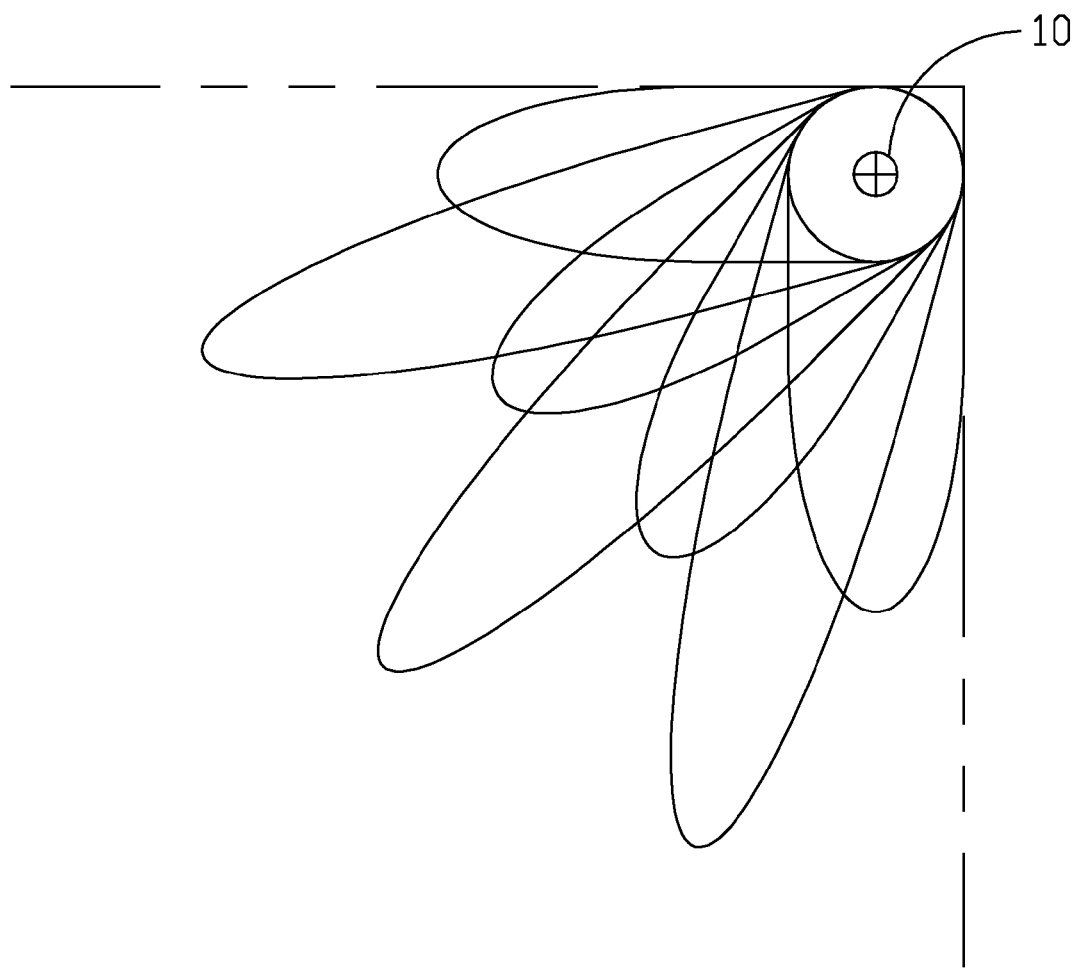

Another method of designing a specific composite beam in accordance with embodiments of the present invention is to use standard layout tools such as drafting board, computer-aided design software, or other tool(s) to arrange the selected beam shapes to create a composite pattern. For example, if the composite beam pattern desired looked similar to as shown in FIG. 3B then the available optics would be selected based on their distribution and intensity. These individual beams would be arranged to fill the area and multiple beams overlaid to achieve the desired intensity.

The following Table 3.0 describes the optic selection and orientation of the individual beams form the light source optics system to create a composite beam shown in FIG. 3B.

TABLE 3.0

| Optic type (see FIG. 4) | Reflector Rotation (0 degrees is straight out, 90 is left and right) |
|---|---|
| 400, 402 | 0 |
| 400, 402 | 7.5, −7.5 |
| 400, 402 | 15, −15 |
| 400, 402 | 22.5, −22.5 |
| 400, 402 | 30, −30 |
| 400, 402 | 37.5, −37.5 |
| 400, 402 | 45 |
| 400, 402 | 52.5 |
| 400, 402 | 60 |
| 400, 402 | 67.5, −67.5 |
| 400, 402 | 75, −75 |
| 400, 402 | 82.5, −82.5 |
| 400, 402 | 90, −90 |
| 401 | −45 |
| 401 | −52.5 |
| 401 | −60 |

Design of Beam by Other Methods

Other methods of composite beam design are possible and considered included in this application.

In addition to designing a composite beam based on the use of a single fixture, embodiments of the present invention may use multiple fixtures to target the same or overlapping areas in order to build up intensity to desired levels based on well known principals of lighting. The composite beams from two or more fixtures would be combined to provide illumination over the entire target area.

Customized Beam Examples

Figure 12A:
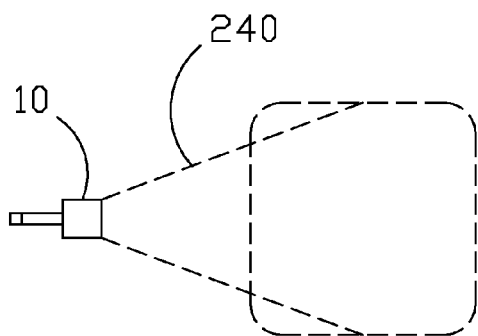
FIGS. 12A-12C illustrate a composite beam with a relatively narrow beam and large incident angle according to embodiments of the present invention.
Figure 12B:
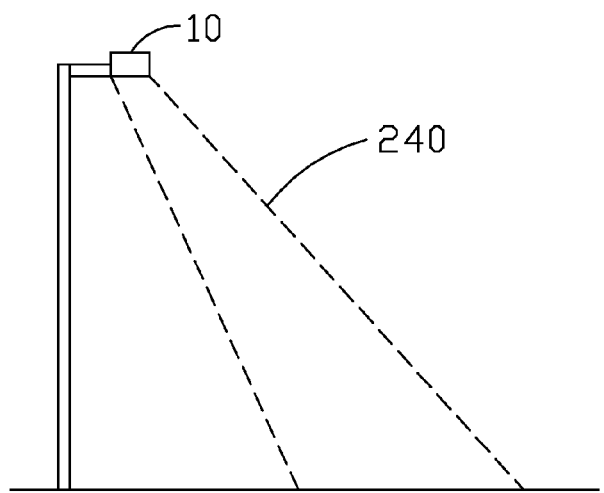
Figure 12C:
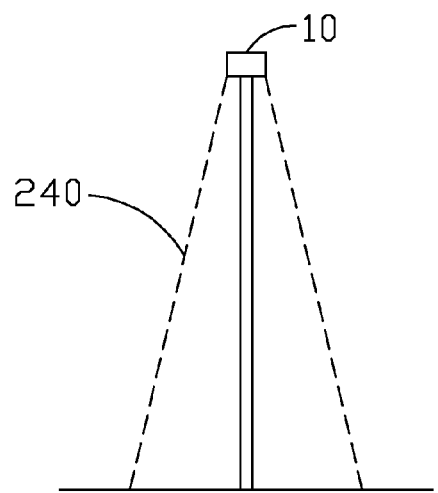

The following figures illustrate various simplified composite beams in accordance with embodiments of the present invention. FIGS. 12A-C show a composite beam with a relatively narrow beam 240 and large incident angle. FIGS. 13A-C shows a composite beam 250 with a wide beam which projects light from a low to high range of incident angles. FIGS. 15A-B shows how a fixture of the type envisioned could provide precise illumination on the face of a tall narrow building. FIG. 15B illustrates a representation of how the individual beams might be combined to cover the desired areas on the building while essentially avoiding wasted or 'spill' light.

Figure 15C:
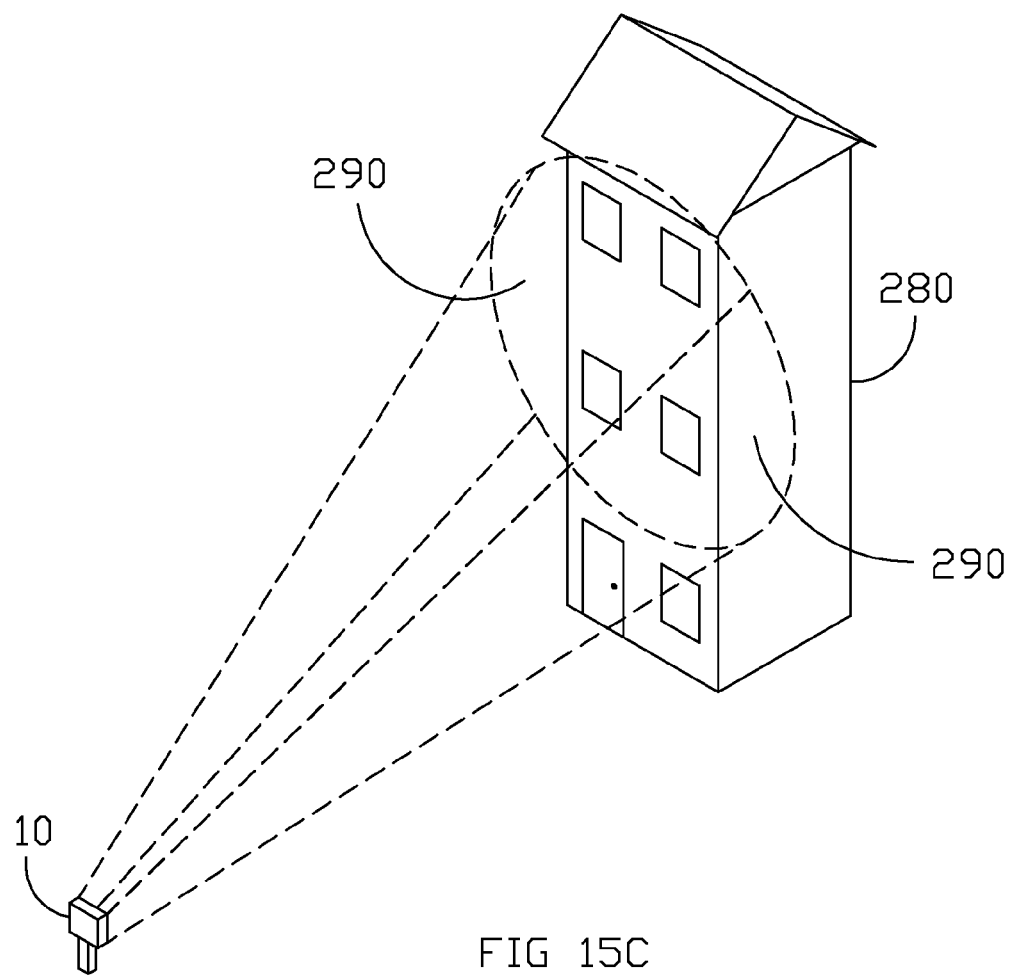
FIGS. 15A-15B illustrate how a fixture, in accordance with embodiments of the present invention can provide precise illumination on the face of a tall, narrow building. For comparison, a conventional fixture with a conventional round beam on a tall, narrow building is shown in FIG. 15C.

FIG. 15C shows a building as it might be illuminated by a conventional light fixture or an LED-type fixture with simple optics. The round beam fully illuminates the building but has significant spill light 290. FIG. 15B shows, in simplified form, how the same building might be illuminated by the composite beam from a fixture in accordance with embodiments of the present invention. The multiple individual beams are directed so as to avoid significant spill light but to provide complete illumination of the target area.

Figure 14A:
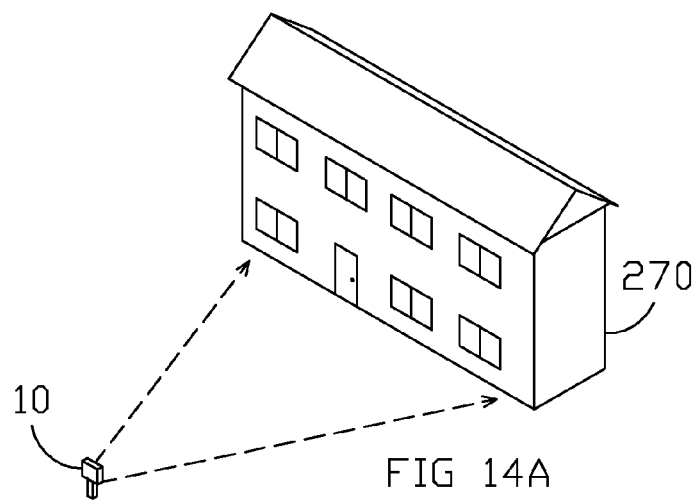
FIGS. 14A-14C illustrate another building type that might be illuminated by a fixture in accordance with embodiments of the present invention.
Figure 14B:
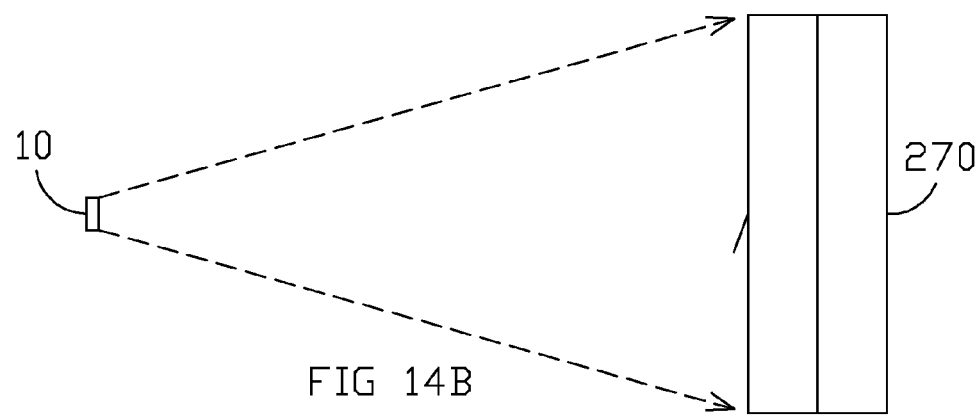
Figure 14C:
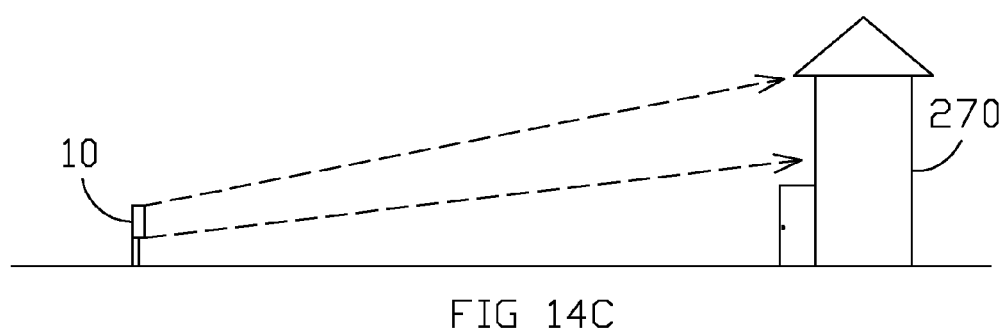

FIGS. 14A-C illustrate another building type that might be illuminated by a fixture in accordance with embodiments of the present invention. FIGS. 16A-D show how an existing fixture that provides light beam 320 which is suitable for illuminating a wide building (300) spills over at 330 and would be unsuitable for a narrow building 310. The beam as modified (340, FIG. 16D) illustrates how fixture 10 could be designed to provide the correct illumination for building 310 in accordance with embodiments of the present invention.

The composite beams of FIGS. 3A-E also illustrates how customized, or non-standard, composite beam shapes can be created to fit the needs of special applications. For example, the composite beam of FIG. 3E would be well suited for illumination in the corner of a target area. FIG. 3B also illustrates how the intensity in the distal portion of the beam can be increased by overlaying beams, (beam shapes 400 and 401 in this example).

D. Exemplary Apparatus—Reflective Lens Fixture

Fixture Construction

One example of a fixture 10 with individual optics is shown in FIG. 1A. The solid-state light sources 20 are mounted on a circuit board 80, FIG. 1E, or other structure, in an offset row pattern. According to embodiments of the present invention, other patterns could also be used. Individual reflectors produce the desired beam pattern from each source and are also mounted on the circuit board, above each light source and oriented in the desired direction. The reflectors in embodiments of the present invention can be more or less specular, diffusing, and/or absorbing, depending on the desired effect.

Various methods of attaching the reflector to the circuit board, or other structure, are available in embodiments of the present invention. Examples of means for attaching the reflector include, but are not limited to, mounting as individual pieces above the light sources, mounting pins, fasteners or adhesive. An automated pick and place assembly machine can be used in embodiments of the present invention to ensure accurate placement of the reflectors and correct orientation per the lighting design. Alternatively, the reflectors can be mounted to a substructure or frame 90, FIG. 1D-1E, which provides orientation and indexing.

Optics

The individual optic used in the fixture of FIG. 1A is a reflector (30, FIG. 1C) over the LED light source 20 which projects the light in a desired pattern, based on the reflector design. The plurality of reflectors are oriented in various directions, providing a beam pattern as illustrated in FIG. 2A as one example of a possible composite beam pattern. Orientation of each reflector is determined based on the desired beam pattern and intensity.

Figure 5:
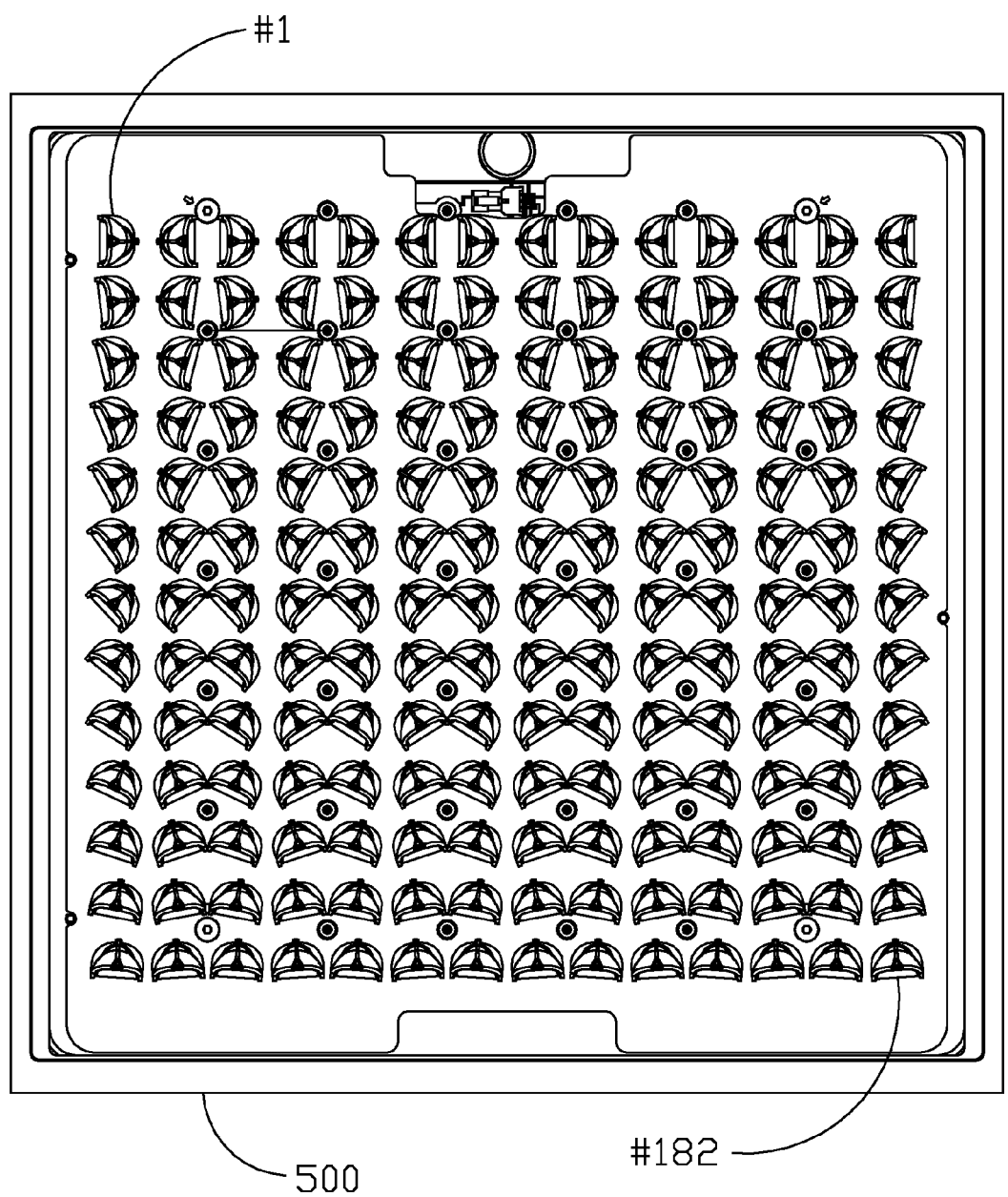
FIG. 5 illustrates aspects of an example fixture using reflector type optics according to embodiments of the present invention.

The reflectors can be offset from each other to avoid potentially blocking light from the light source to its rear. They can include an optional v-shaped notch in reflector 30 (FIG. 6C and FIG. 9) to allow some of the light to be directed downward instead of outwardly. This provides lighting directly below or in front of the fixture. FIG. 5 illustrates an array 500 of individual light sources and examples of possible angular orientations for typical reflectors in accordance with embodiments of the present invention.

The reflector can be made of various materials depending on application, cost considerations, availability, etc. For example, a reflector could be made of molded plastic with metallized surface, injection molded, machined and polished from aluminum, etc.

An example of a type of adjustment or indexing method could be capturing the individual lenses in a circular hole which could have degree or index marks. The lenses could be equipped with a screwdriver slot and adjusted to a desired position. Or lenses could be positioned by precision equipment which is temporarily indexed to the fixture. Lenses might be held in place by a friction fit or by any number of clamping or fastening methods. The optics could also be simply positioned in a matrix 90, FIG. 1E, using an indexing system (e.g. cut-outs 95, spacers, bosses, etc.). Additionally, fine-tuning of light distribution could be accomplished on site, and light distribution from a fixture could be modified if needs for a specific location should change.

Figure 1C:
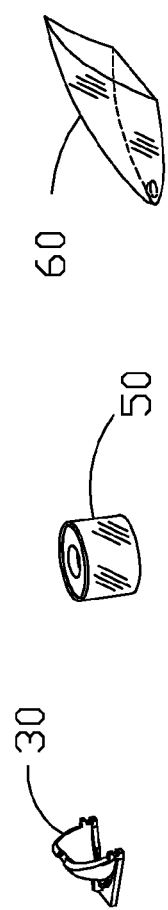
FIG. 1C illustrates a fixture according to embodiments of the present invention.
Figure 1D:
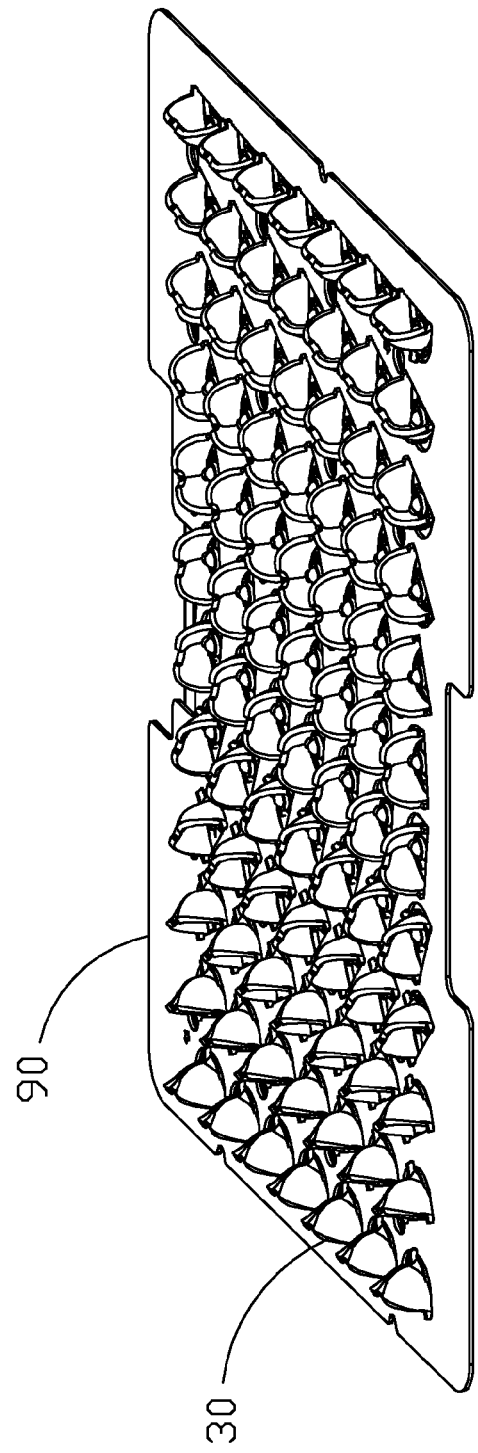
FIG. 1D illustrates a substructure or frame which provides orientation and indexing according to embodiments of the present invention.
Figure 1E:
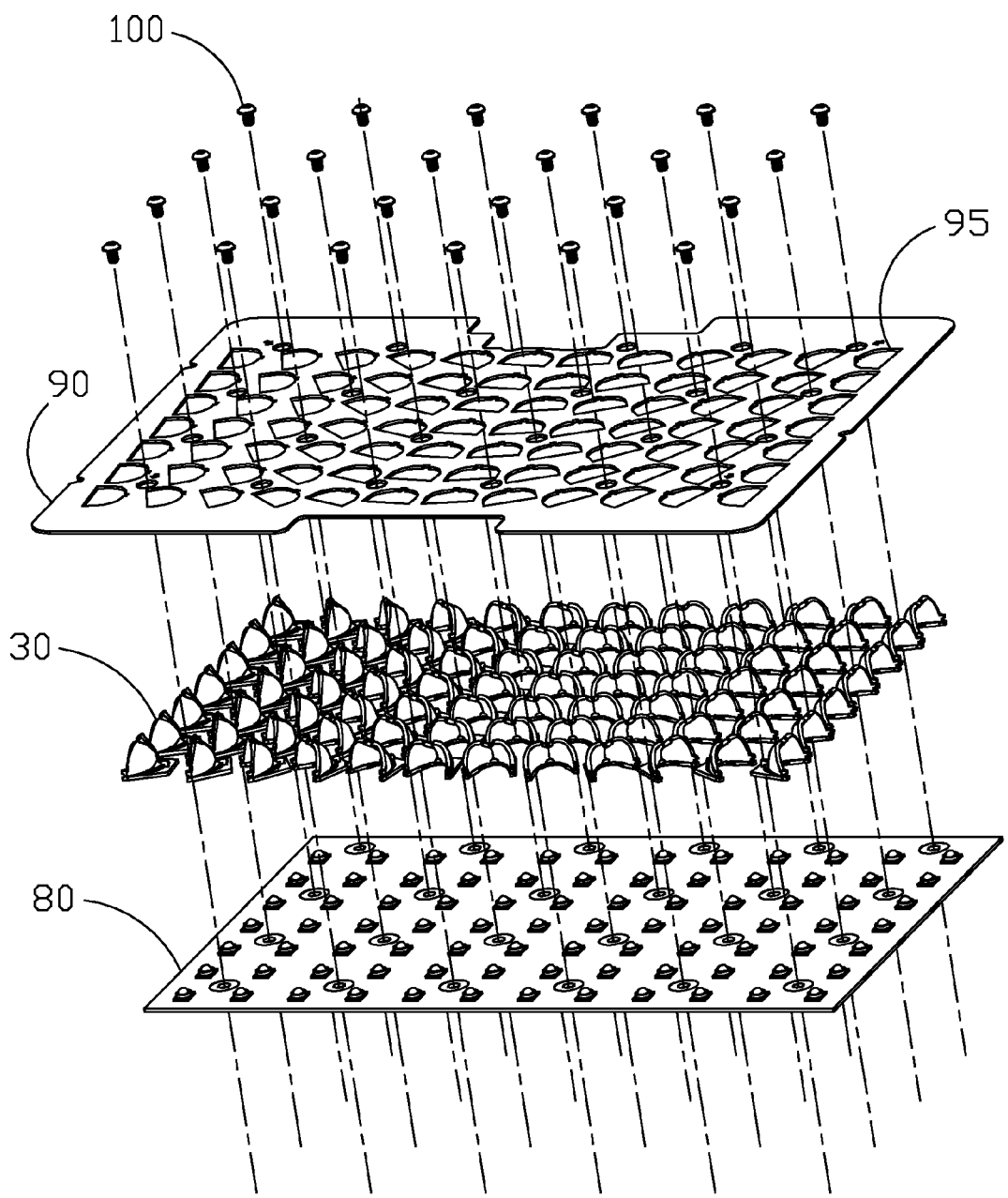
FIG. 1E illustrates a method of assembly of an array of LEDs and optics according to embodiments of the present invention.
Figure 2B:
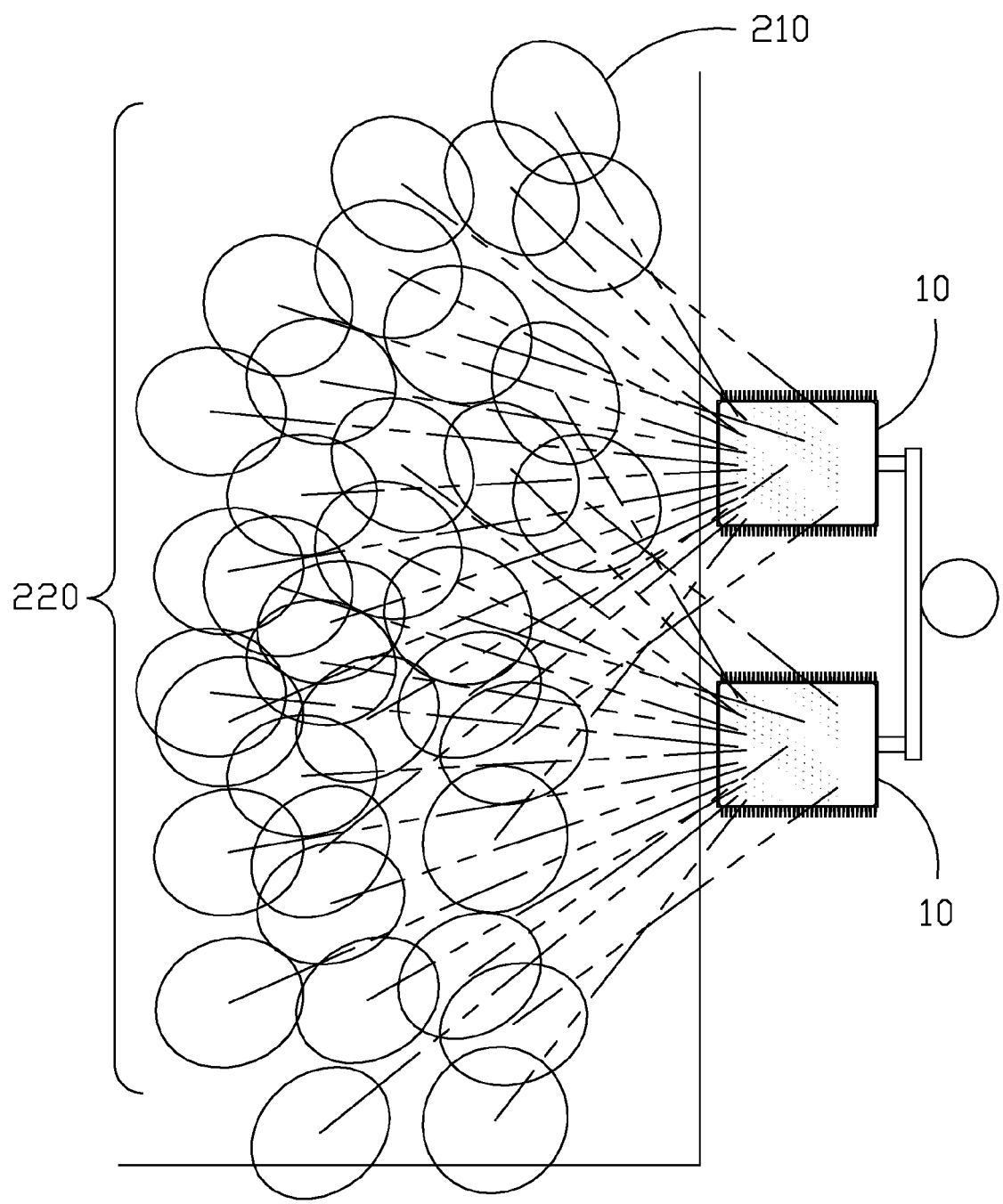

In accordance with some embodiments, the indexing system could be machined or manufactured automatically as part of the matrix 90; the array of optics can be attached such that the predetermined spacing, rotational positioning, etc. is established and maintained with reference to the individual light sources and the light fixture by using mounting pins, screws, bosses, etc. that mate precisely with indices in the mounting structure of the individual light sources (see e.g. 100, FIG. 1E). Further, this method of mounting could provide a high degree of accuracy in mounting over a long period of time (on the order of decades of years), and the method of mounting the optic array to the individual light sources relies on a small number of components manufactured to certain tolerances in order to ensure precise indexing of the mating components.

Figure 10:
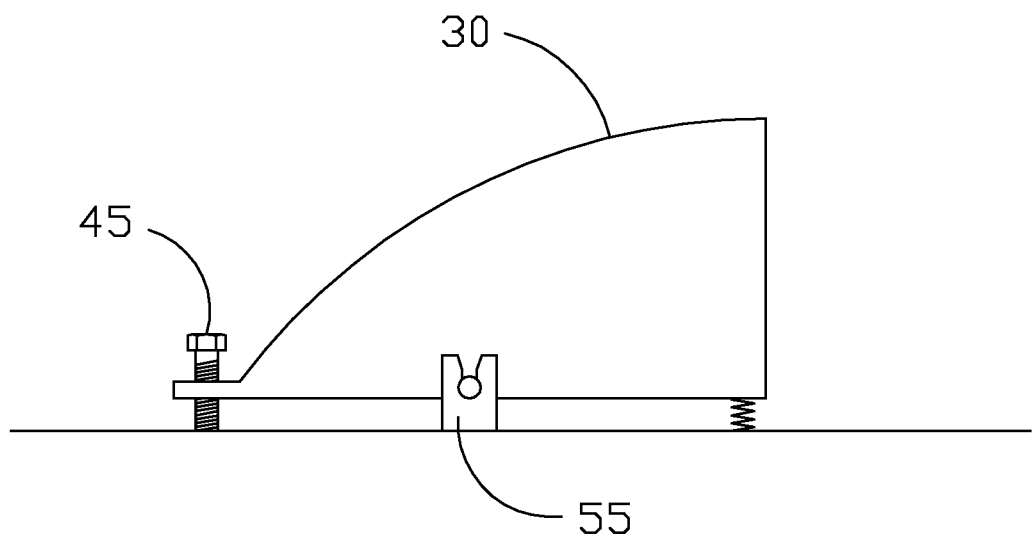
FIG. 10 illustrates a means of adjustment of an optic according to embodiments of the present invention.

Further adjustments could be included as part of the system to allow adjustment in a plane that is not generally parallel to the fixture. For instance, reflectors could be adjusted by 'tipping' the reflector relative to the mounting plane, using trunnion-type mounts 55 with e.g. setscrew 45 or gear and sector adjustments (see FIG. 10). Similarly, overlays could be designed to hold the reflector at a specific 'vertical' angle relative to the mounting surface or template.

Example of Beam Layout

Table 4.0 describes one possible method of arranging the individual beams from the light source optics system in FIG. 5 to create a composite beam. In this example, the general composite beam is an IES type 4 shape. The reflectors in this embodiment are all parabolic but other shapes could be used. In this example, the general composite beam is produced with a common optic design, of a parabolic design, used throughout the set of light sources on the fixture 500. See FIG. 5 for an example fixture and optical layout in reference to Table 4.0 below.

TABLE 4.0

| Source/optic ID # | X (mm) | Y (mm) | Z (mm) | Reflector Rotation (0 degrees is straight out, 90 is left and right) |
|---|---|---|---|---|
| 1 | 0 | 0 | 0 | −90 |
| 2 | 28 | 0 | 0 | 90 |
| 3 | 56 | 0 | 0 | −90 |
| 4 | 84 | 0 | 0 | 90 |
| 5 | 112 | 0 | 0 | −90 |
| 6 | 140 | 0 | 0 | 90 |
| 7 | 168 | 0 | 0 | −90 |
| 8 | 196 | 0 | 0 | 90 |
| 9 | 224 | 0 | 0 | −90 |
| 10 | 252 | 0 | 0 | 90 |
| 11 | 280 | 0 | 0 | −90 |
| 12 | 308 | 0 | 0 | 90 |
| 13 | 336 | 0 | 0 | −90 |
| 14 | 364 | 0 | 0 | 90 |
| 15 | 0 | 28 | 0 | −82.8 |
| 16 | 28 | 28 | 0 | 82.8 |
| 17 | 56 | 28 | 0 | −82.8 |
| 18 | 84 | 28 | 0 | 82.8 |
| 19 | 112 | 28 | 0 | −82.8 |
| 20 | 140 | 28 | 0 | 82.8 |
| 21 | 168 | 28 | 0 | −82.8 |
| 22 | 196 | 28 | 0 | 82.8 |
| 23 | 224 | 28 | 0 | −82.8 |
| 24 | 252 | 28 | 0 | 82.8 |
| 25 | 280 | 28 | 0 | −82.8 |
| 26 | 308 | 28 | 0 | 82.8 |
| 27 | 336 | 28 | 0 | −82.8 |
| 28 | 364 | 28 | 0 | 82.8 |
| 29 | 0 | 56 | 0 | −75.6 |
| 30 | 28 | 56 | 0 | 75.6 |
| 31 | 56 | 56 | 0 | −75.6 |
| 32 | 84 | 56 | 0 | 75.6 |
| 33 | 112 | 56 | 0 | −75.6 |
| 34 | 140 | 56 | 0 | 75.6 |

TABLE 4.0-continued

| Source/optic ID # | X (mm) | Y (mm) | Z (mm) | Reflector Rotation (0 degrees is straight out, 90 is left and right) |
|---|---|---|---|---|
| 35 | 168 | 56 | 0 | −75.6 |
| 36 | 196 | 56 | 0 | 75.6 |
| 37 | 224 | 56 | 0 | −75.6 |
| 38 | 252 | 56 | 0 | 75.6 |
| 39 | 280 | 56 | 0 | −75.6 |
| 40 | 308 | 56 | 0 | 75.6 |
| 41 | 336 | 56 | 0 | −75.6 |
| 42 | 364 | 56 | 0 | 75.6 |
| 43 | 0 | 84 | 0 | −68.4 |
| 44 | 28 | 84 | 0 | 68.4 |
| 45 | 56 | 84 | 0 | −68.4 |
| 46 | 84 | 84 | 0 | 68.4 |
| 47 | 112 | 84 | 0 | −68.4 |
| 48 | 140 | 84 | 0 | 68.4 |
| 49 | 168 | 84 | 0 | −68.4 |
| 50 | 196 | 84 | 0 | 68.4 |
| 51 | 224 | 84 | 0 | −68.4 |
| 52 | 252 | 84 | 0 | 68.4 |
| 53 | 280 | 84 | 0 | −68.4 |
| 54 | 308 | 84 | 0 | 68.4 |
| 55 | 336 | 84 | 0 | −68.4 |
| 56 | 364 | 84 | 0 | 68.4 |
| 57 | 0 | 112 | 0 | −61.2 |
| 58 | 28 | 112 | 0 | 61.2 |
| 59 | 56 | 112 | 0 | −61.2 |
| 60 | 84 | 112 | 0 | 61.2 |
| 61 | 112 | 112 | 0 | −61.2 |
| 62 | 140 | 112 | 0 | 61.2 |
| 63 | 168 | 112 | 0 | −61.2 |
| 64 | 196 | 112 | 0 | 61.2 |
| 65 | 224 | 112 | 0 | −61.2 |
| 66 | 252 | 112 | 0 | 61.2 |
| 67 | 280 | 112 | 0 | −61.2 |
| 68 | 308 | 112 | 0 | 61.2 |
| 69 | 336 | 112 | 0 | −61.2 |
| 70 | 364 | 112 | 0 | 61.2 |
| 71 | 0 | 140 | 0 | −54 |
| 72 | 28 | 140 | 0 | 54 |
| 73 | 56 | 140 | 0 | −54 |
| 74 | 84 | 140 | 0 | 54 |
| 75 | 112 | 140 | 0 | −54 |
| 76 | 140 | 140 | 0 | 54 |
| 77 | 168 | 140 | 0 | −54 |
| 78 | 196 | 140 | 0 | 54 |
| 79 | 224 | 140 | 0 | −54 |
| 80 | 252 | 140 | 0 | 54 |
| 81 | 280 | 140 | 0 | −54 |
| 82 | 308 | 140 | 0 | 54 |
| 83 | 336 | 140 | 0 | −54 |
| 84 | 364 | 140 | 0 | 54 |
| 85 | 0 | 168 | 0 | −46.8 |
| 86 | 28 | 168 | 0 | 46.8 |
| 87 | 56 | 168 | 0 | −46.8 |
| 88 | 84 | 168 | 0 | 46.8 |
| 89 | 112 | 168 | 0 | −46.8 |
| 90 | 140 | 168 | 0 | 46.8 |
| 91 | 168 | 168 | 0 | −46.8 |
| 92 | 196 | 168 | 0 | 46.8 |
| 93 | 224 | 168 | 0 | −46.8 |
| 94 | 252 | 168 | 0 | 46.8 |
| 95 | 280 | 168 | 0 | −46.8 |
| 96 | 308 | 168 | 0 | 46.8 |
| 97 | 336 | 168 | 0 | −46.8 |
| 98 | 364 | 168 | 0 | 46.8 |
| 99 | 0 | 196 | 0 | −39.6 |
| 100 | 28 | 196 | 0 | 39.6 |
| 101 | 56 | 196 | 0 | −39.6 |
| 102 | 84 | 196 | 0 | 39.6 |
| 103 | 112 | 196 | 0 | −39.6 |
| 104 | 140 | 196 | 0 | 39.6 |
| 105 | 168 | 196 | 0 | −39.6 |
| 106 | 196 | 196 | 0 | 39.6 |
| 107 | 224 | 196 | 0 | −39.6 |
| 108 | 252 | 196 | 0 | 39.6 |
| 109 | 280 | 196 | 0 | −39.6 |
| 110 | 308 | 196 | 0 | 39.6 |
| 111 | 336 | 196 | 0 | −39.6 |
| 112 | 364 | 196 | 0 | 39.6 |
| 113 | 0 | 224 | 0 | −32.4 |
| 114 | 28 | 224 | 0 | 32.4 |
| 115 | 56 | 224 | 0 | −32.4 |
| 116 | 84 | 224 | 0 | 32.4 |
| 117 | 112 | 224 | 0 | −32.4 |
| 118 | 140 | 224 | 0 | 32.4 |
| 119 | 168 | 224 | 0 | −32.4 |
| 120 | 196 | 224 | 0 | 32.4 |
| 121 | 224 | 224 | 0 | −32.4 |
| 122 | 252 | 224 | 0 | 32.4 |
| 123 | 280 | 224 | 0 | −32.4 |
| 124 | 308 | 224 | 0 | 32.4 |
| 125 | 336 | 224 | 0 | −32.4 |
| 126 | 364 | 224 | 0 | 32.4 |
| 127 | 0 | 252 | 0 | −25.2 |
| 128 | 28 | 252 | 0 | 25.2 |
| 129 | 56 | 252 | 0 | −25.2 |
| 130 | 84 | 252 | 0 | 25.2 |
| 131 | 112 | 252 | 0 | −25.2 |
| 132 | 140 | 252 | 0 | 25.2 |
| 133 | 168 | 252 | 0 | −25.2 |
| 134 | 196 | 252 | 0 | 25.2 |
| 135 | 224 | 252 | 0 | −25.2 |
| 136 | 252 | 252 | 0 | 25.2 |
| 137 | 280 | 252 | 0 | −25.2 |
| 138 | 308 | 252 | 0 | 25.2 |
| 139 | 336 | 252 | 0 | −25.2 |
| 140 | 364 | 252 | 0 | 25.2 |
| 141 | 0 | 280 | 0 | −18 |
| 142 | 28 | 280 | 0 | 18 |
| 143 | 56 | 280 | 0 | −18 |
| 144 | 84 | 280 | 0 | 18 |
| 145 | 112 | 280 | 0 | −18 |
| 146 | 140 | 280 | 0 | 18 |
| 147 | 168 | 280 | 0 | −18 |
| 148 | 196 | 280 | 0 | 18 |
| 149 | 224 | 280 | 0 | −18 |
| 150 | 252 | 280 | 0 | 18 |
| 151 | 280 | 280 | 0 | −18 |
| 152 | 308 | 280 | 0 | 18 |
| 153 | 336 | 280 | 0 | −18 |
| 154 | 364 | 280 | 0 | 18 |
| 155 | 0 | 308 | 0 | −10.8 |
| 156 | 28 | 308 | 0 | 10.8 |
| 157 | 56 | 308 | 0 | −10.8 |
| 158 | 84 | 308 | 0 | 10.8 |
| 159 | 112 | 308 | 0 | −10.8 |
| 160 | 140 | 308 | 0 | 10.8 |
| 161 | 168 | 308 | 0 | −10.8 |
| 162 | 196 | 308 | 0 | 10.8 |
| 163 | 224 | 308 | 0 | −10.8 |
| 164 | 252 | 308 | 0 | 10.8 |
| 165 | 280 | 308 | 0 | −10.8 |
| 166 | 308 | 308 | 0 | 10.8 |
| 167 | 336 | 308 | 0 | −10.8 |
| 168 | 364 | 308 | 0 | 10.8 |
| 169 | 0 | 336 | 0 | −3.6 |
| 170 | 28 | 336 | 0 | 3.6 |
| 171 | 56 | 336 | 0 | −3.6 |
| 172 | 84 | 336 | 0 | 3.6 |
| 173 | 112 | 336 | 0 | −3.6 |
| 174 | 140 | 336 | 0 | 3.6 |
| 175 | 168 | 336 | 0 | −3.6 |
| 176 | 196 | 336 | 0 | 3.6 |
| 177 | 224 | 336 | 0 | −3.6 |
| 178 | 252 | 336 | 0 | 3.6 |
| 179 | 280 | 336 | 0 | −3.6 |
| 180 | 308 | 336 | 0 | 3.6 |
| 181 | 336 | 336 | 0 | −3.6 |
| 182 | 364 | 336 | 0 | 3.6 |

E. Exemplary Apparatus—Refractive Lens

Optical refractive lenses 60, or TIR lenses 50, FIG. 1C, could be placed over the LED light sources to distribute the light, creating a similar effect, i.e. a highly controlled and customizable composite beam from a light fixture(s) with a plurality of light sources. The lenses can be made of various materials depending on application, cost considerations, availability, etc. For example, the lens could be made of molded plastic, optical glass, etc.

F. Exemplary Apparatus—Visor Strips

Figure 7A:
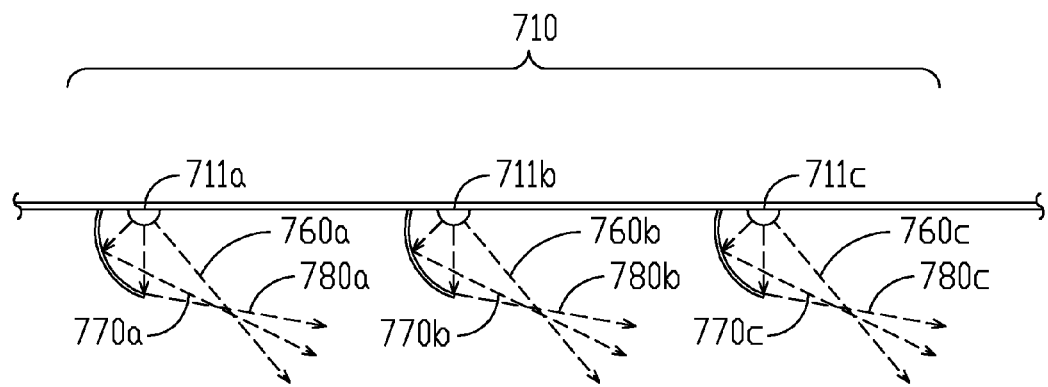
FIGS. 7A-7D illustrate the need for and application of a 'visor' according to embodiments of the present invention.
Figure 7B:
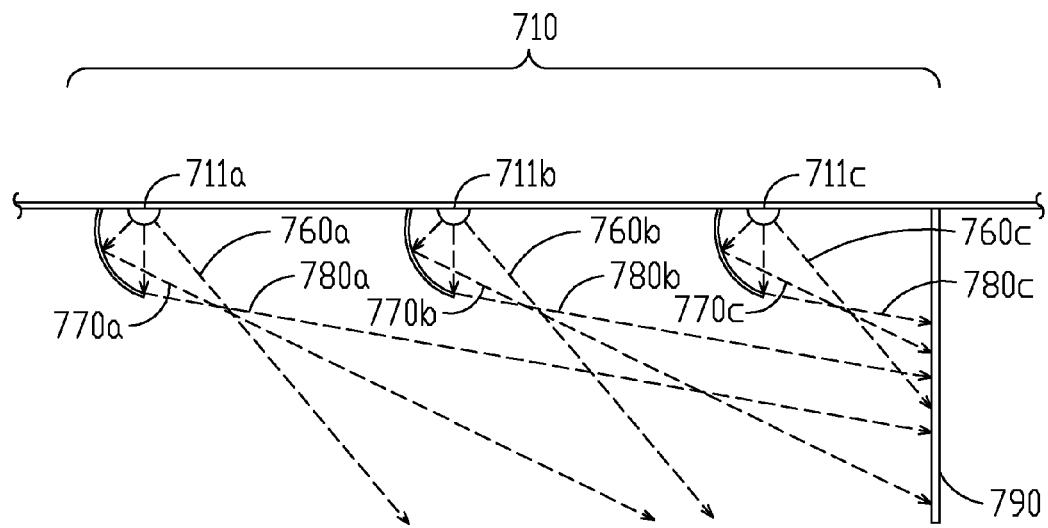
Figure 7C:
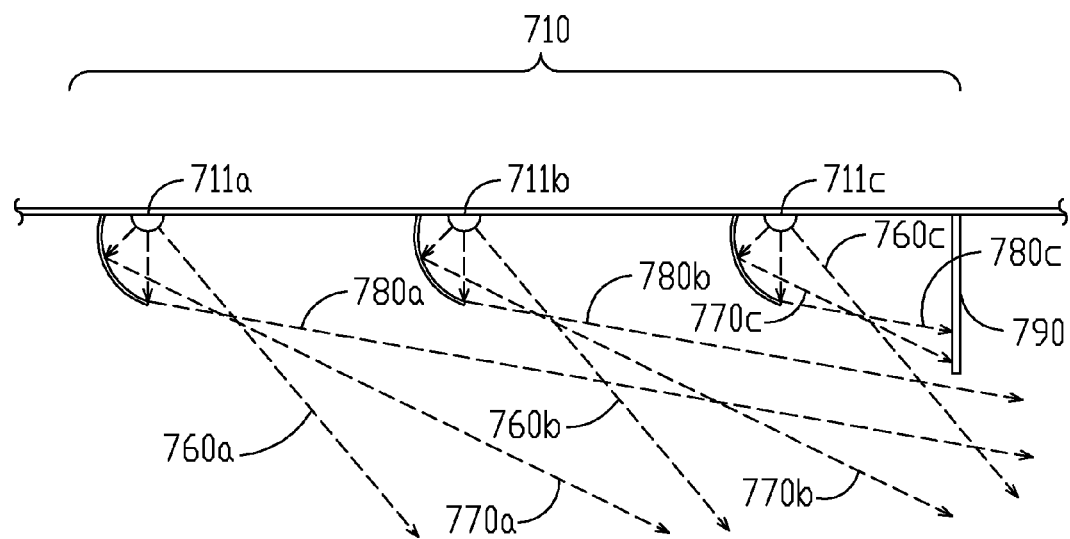
Figure 7D:
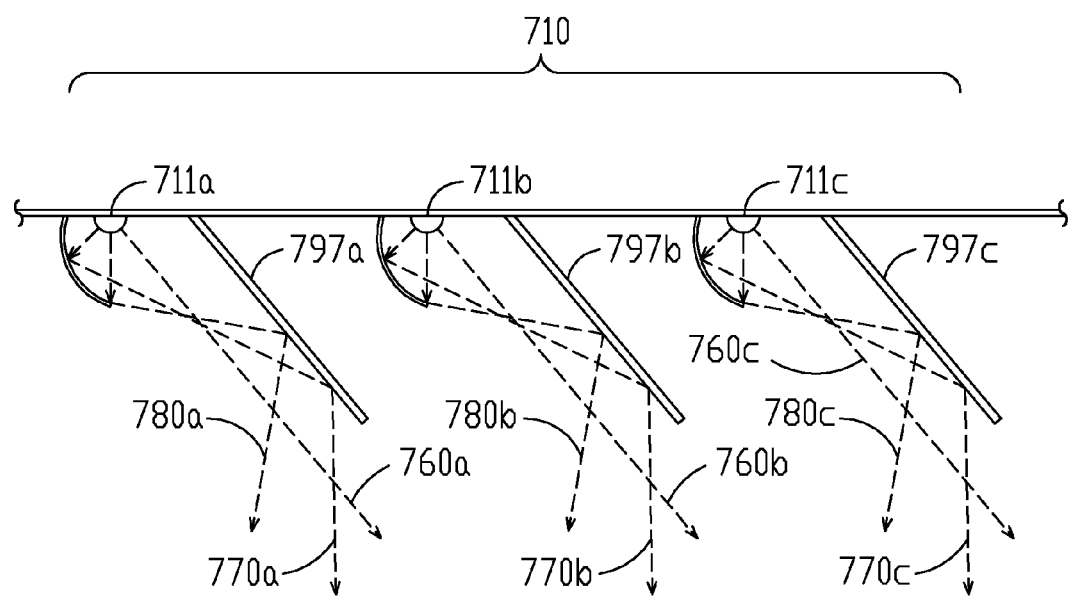
Figure 8A:
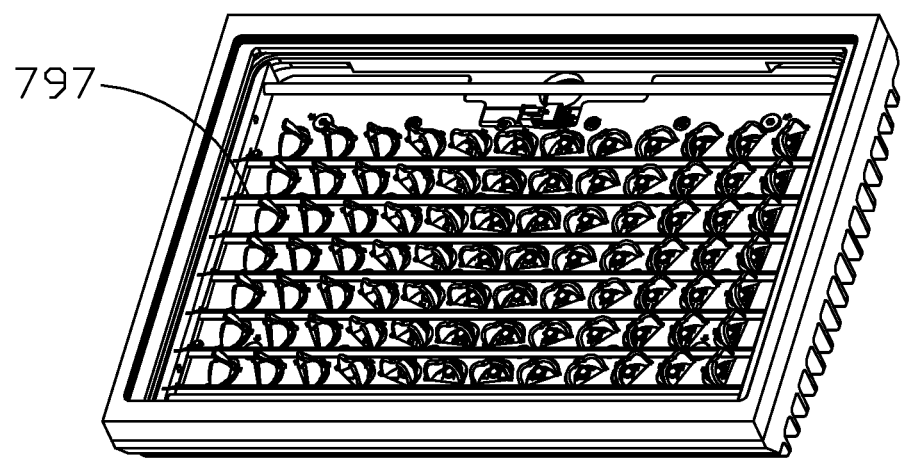
FIGS. 8A-8B illustrate and application of the 'visor' to arrays of LEDs according to embodiments of the present invention.
Figure 8B:
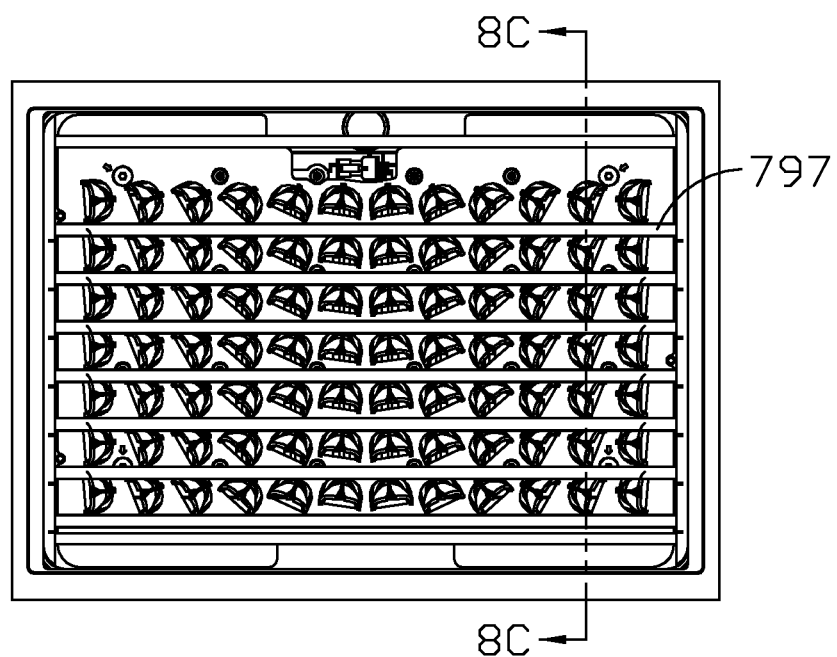
Figure 8C:
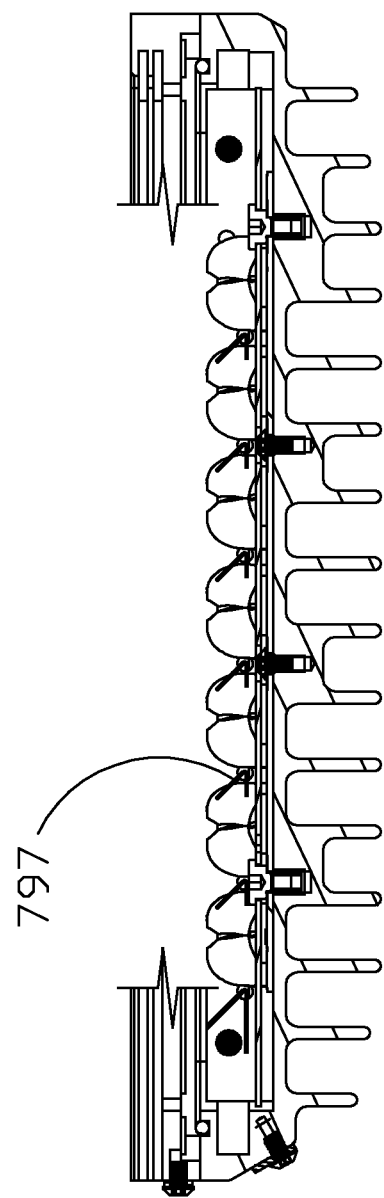
FIG. 8C illustrates a section view (with some lines removed) of a fixture according to embodiments of the present invention having 'visors' applied to arrays of LEDs according to embodiments of the present invention.
Figure 11A:
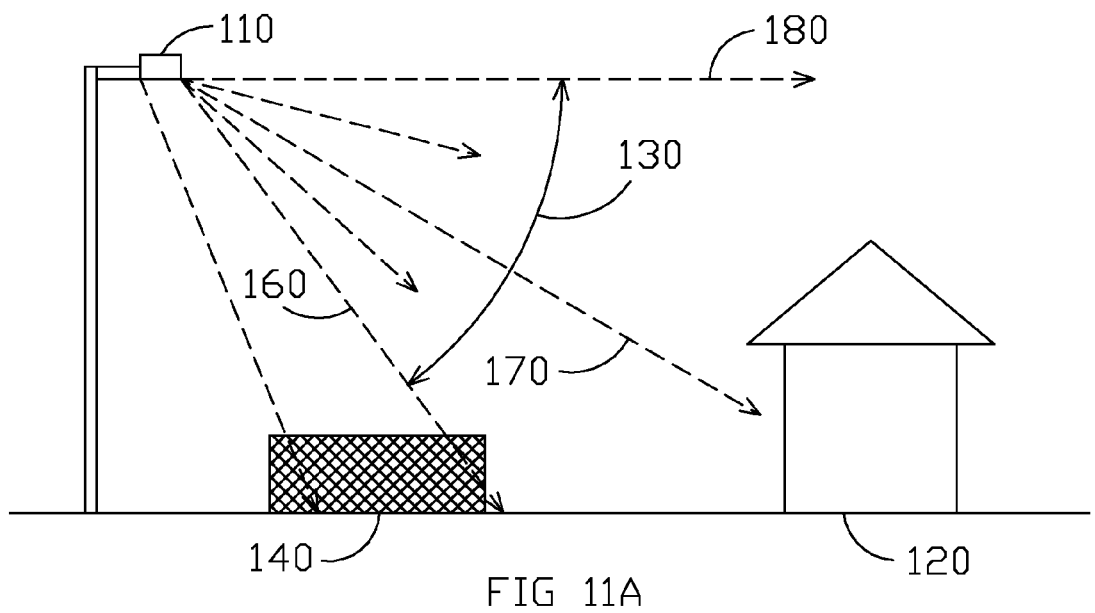
FIGS. 11A-11B illustrate differences in the effect of lighting with and without control of spill light.
Figure 11B:
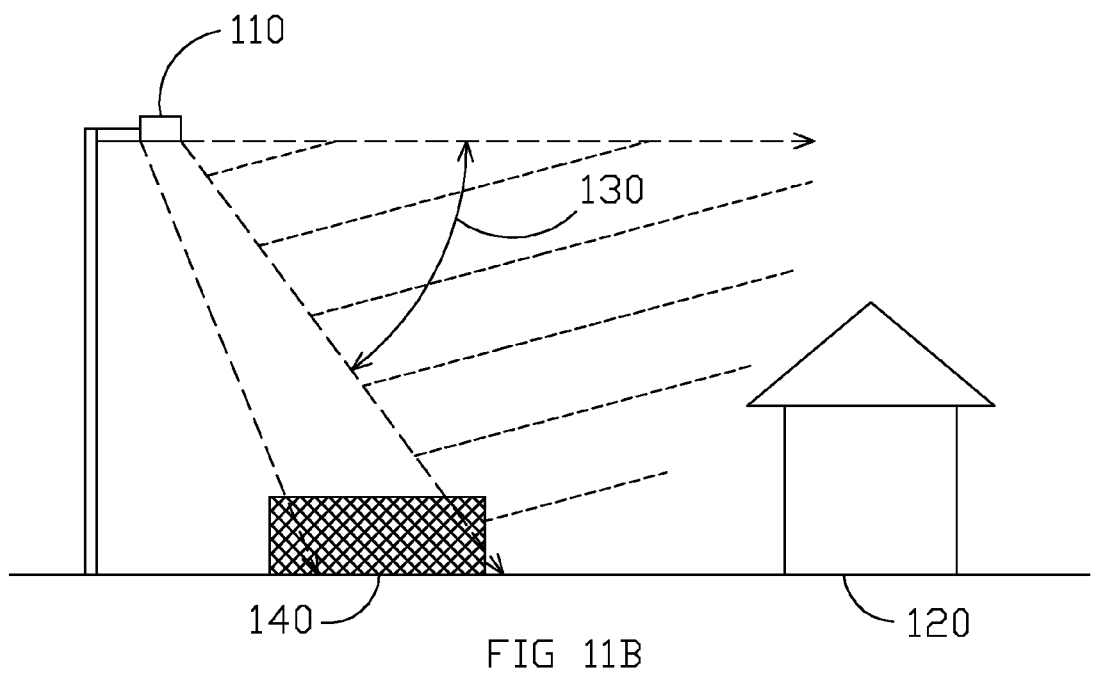

In embodiments of the present invention, visor strips as shown in FIGS. 8A-C and are installed in order to limit the angle of emittance from the fixture. FIG. 7a illustrates representative light rays 760a-c, 770a-c, and 780a-c emanating from light source 711a-c in a simplified fixture 710 according to aspects of the invention. In FIG. 11A, exemplary rays 170 and 180 (composed of multiple rays 770a-n and 780a-n as represented in FIG. 7a) emanating from light fixture 10 are at an undesirable angle such that instead of illuminating tennis court 140, FIG. 11A-B, they continue in an undesired direction 130. Installing visor 790 as in FIG. 7b blocks all rays 770 and 780 as desired, but also blocks ray 760c from LED 711c. Installing visor 790 as in FIG. 7c does allows transmission of rays 760a-c as desired, but also allows transmission of rays 770a-b and 780a-b, which is not desired. An optional solution according to embodiments of the present invention is shown in FIG. 7d. In the embodiment shown in FIG. 7d, installing identical visor strips 797a-c allow rays 760a-c to be transmitted as desired, and blocks the respective rays 770a-c and 780a-c from their undesired paths and redirects them to provide useable light in the target area.

These visor strips are shown in use with reflective optics, however the strips can be used with refractive or other optics in embodiments of the present invention.

The visor strips could be constructed of metal, plastic, or other materials. They can be coated with various materials to provide any type of surface desired, such as specular, diffuse, or light absorbing. The size (i.e. height), placement and angle of the visor strips could be calculated in order to provide specific benefits, such as (a) blocking light at a certain angle relative to the fixture, (b) reflecting light down as seen in FIG. 7D in order to provide additional light in a given area (e.g. directly below/in front of a mounting pole/structure). The edges of the visor strips could be linear or could be shaped or modified to provide specific light diffusion characteristics. Optionally, instead of having planar surfaces, the visor strips could be given shapes that would provide further benefits for control or distribution of light in embodiments of the present invention.

The visor strips 797 could be mounted (a) in a standard configuration per fixture, (b) could be designed and mounted at a specific angle or location according to a custom or semi-custom fixture configuration, or (c) could be adjustable by the installer or user. The mounting angle and height of the visor strips 797, FIG. 7D, relative to the fixture could be adjusted in the factory or field. For example, in embodiments of the present invention the fixtures could be adjusted by either a mechanism that provides variable tilt, or by installation of visor strips with a mounting angle that could be specified, or by other means. Mounting height could be adjusted by shims, selection of different height visors per application, threaded adjustment, or other means.

G. Exemplary Apparatus—Light Blocking Tabs

Figure 9:
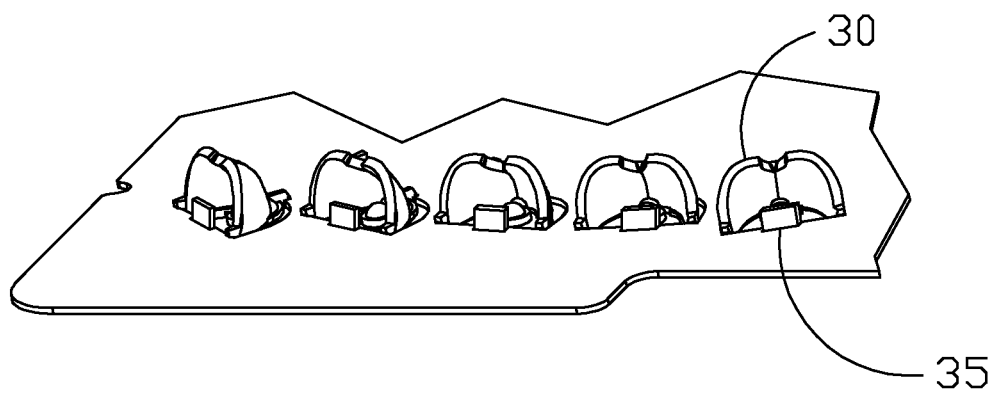
FIG. 9 illustrates an application of a reflective tab to an array of LEDs according to embodiments of the present invention.

An additional optional feature is a protruding tab 35 FIG. 9 in the vicinity of the light source which is used to block and/or reflect light which is directly emitted by the light source rather than being reflected from the reflector. The tab could be made of material which would block or reflect light, and could be more or less specular, diffusing, and/or absorbing, depending on the desired effect, position relative to the source, etc.

H. Exemplary Apparatus—Combination of Lens Types

In accordance with embodiments of the present invention, the individual optic combinations in the fixture can include a mix of refractive lenses and reflectors and may also include reflective tabs or visor strips.

I. Apparatus—Exemplary, Not Limiting

The components described above are meant to exemplify some types of possibilities. In no way should the aforementioned examples limit the scope of the invention, as they are only exemplary embodiments.

In conclusion, as illustrated through the exemplary embodiments, the present invention provides novel systems, methods and arrangements for deriving composite beams from LED or other lighting. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations thereof.

What is claimed is:

1. A method of creating highly customizable light beam patterns from a light fixture so to illuminate a target area having defined boundaries comprising:
   a. mounting a plurality of light sources at spaced-apart positions on a substrate, each light source having its individual light output distribution;
   b. positioning an optic relative to each light source to individually control the light output distribution from each light source into a modified light source output distribution according to one or more of:
      i. type of optic, wherein the type of optic is selected from one of (i) light transmitting or (ii) light reflecting or absorbing, and
      ii. orientation of the optic relative its light source;
   c. creating a composite light beam pattern from each light source and optic combination comprising selecting a first subset of light source and light transmitting optic combination to illuminate a first portion of the target area and selecting a second subset of light source and light reflecting or absorbing optic combination to illuminate a second portion of the target area, the second portion of the target area including at least a portion of said defined boundaries.

2. The method of claim 1 wherein the said light source comprises:
   a. a solid state light source;
   b. a high intensity discharge light source; or
   c. an incandescent light source.

3. The method of claim 1 wherein the individual light output distribution can vary between light sources.

4. The method of claim 1 wherein the type of optic can comprise:
   a. a refractive lens,
   b. a total internal reflection lens,
   c. a reflector, d. a light blocking component; or
e. a visor.

5. The method of claim 1 wherein the orientation of the optic can include:
   a. rotational position; or
   b. spacing.

6. The method of claim 1 further comprising assembling the light sources and optics into the fixture.

7. The method of claim 6 further comprising installing the assembled fixture relative the target area to be illuminated.

8. The method of claim 7 further comprising supplying and controlling operating power to the fixture.

9. An apparatus for creating highly customizable light beam patterns from a light fixture comprising:
   a. a plurality of light sources at spaced-apart positions on a substrate, each light source adapted to produce an individual light output distribution;
   b. an optic mounted relative to each light source;
   c. an indexing component to orient each optic relative to its light source comprising a substrate or layer including openings for each optic, the openings cooperating with the optic to orient it; and
   d. each optic adapted to individually control the light output distribution from each light source into a modified light source output distribution according to one or more of:
      i. type of optic, and
      ii. orientation of the optic relative its light source;
   e. so that a customizable composite light beam pattern can be generated from the customizable individual light source and optic combinations.

10. The apparatus of claim 9 wherein the optic comprises one or more of:
    a. a refractive lens,
    b. a total internal reflection lens,
    c. a reflector,
    d. a light blocking component; and
    e. a visor.

11. The apparatus of claim 9 wherein the light source comprises a solid state light source.

12. The apparatus of claim 9 where the individual light output distribution of each light source is a function of:
    a. type of light source;
    b. color of light output;
    c. lumen output;
    d. beam spread; and
    e. beam direction.

13. The apparatus of claim 9 wherein the orientation of the optic relative to the light source comprises one or more of:
    a. rotational orientation; and
    b. spacing.

14. The apparatus of claim 9 wherein the light source positions on the substrate are in a two dimensional matrix of rows and columns.

15. The apparatus of claim 14 wherein the light sources in adjacent rows are offset.

16. The apparatus of claim 9 wherein the openings individually orient the optic in a pre-designed manner.

17. The apparatus of claim 9 wherein the openings individually orient the optic rotationally relative to its light source.

18. The apparatus of claim 9 wherein the openings individually orient the optic axially with its light source.

19. The apparatus of claim 9 further comprising a visor mountable on the substrate of the light sources relative to at least one light source.

20. The apparatus of claim 9 wherein the optics and light sources can vary in type.

21. The apparatus of claim 9 further comprising:
    a. electrical circuitry to each light source;
    b. at least one heat sink for the light sources; and
    c. a housing.

22. The apparatus of claim 9 positioned relative to a target area to be illuminated.

23. The apparatus of claim 9 positioned relative to a target area to be illuminated with one or more additional said apparatuses.

24. The combination of claim 23 comprising said apparatuses elevated on one or more elevating structures and aimed towards the target area to compositely illuminate the target area.

25. The combination of claim 24 further comprising an electrical circuit to power the apparatuses and control their operation.

26. The apparatus of claim 9 in combination with one or more additional said apparatuses and further comprising:
    a. selecting the type and light distribution of each light source;
    b. designing a composite light distribution for the fixture;
    c. designing individual output distributions for the plurality of light sources to create the composite light distribution for the fixture;
    d. orienting an optic relative each light source.

* * * * *